Jan. 30, 1962 D. J. CROWLEY ETAL 3,018,679

APPARATUS FOR SEVERING ELECTRICAL LEADS FROM A CONTINUOUS WIRE SOURCE

Filed Feb. 6, 1957 14 Sheets-Sheet 1

INVENTORS,
DANIEL J. CROWLEY,
EARL E. FOLKENROTH &
DAMON R. PACKARD.
BY
Curtis, Morris & Safford

Fig. 2

INVENTORS,
DANIEL J. CROWLEY,
EARL E. FOLKENROTH &
DAMON R. PACKARD.
BY
Curtis, Morris & Safford

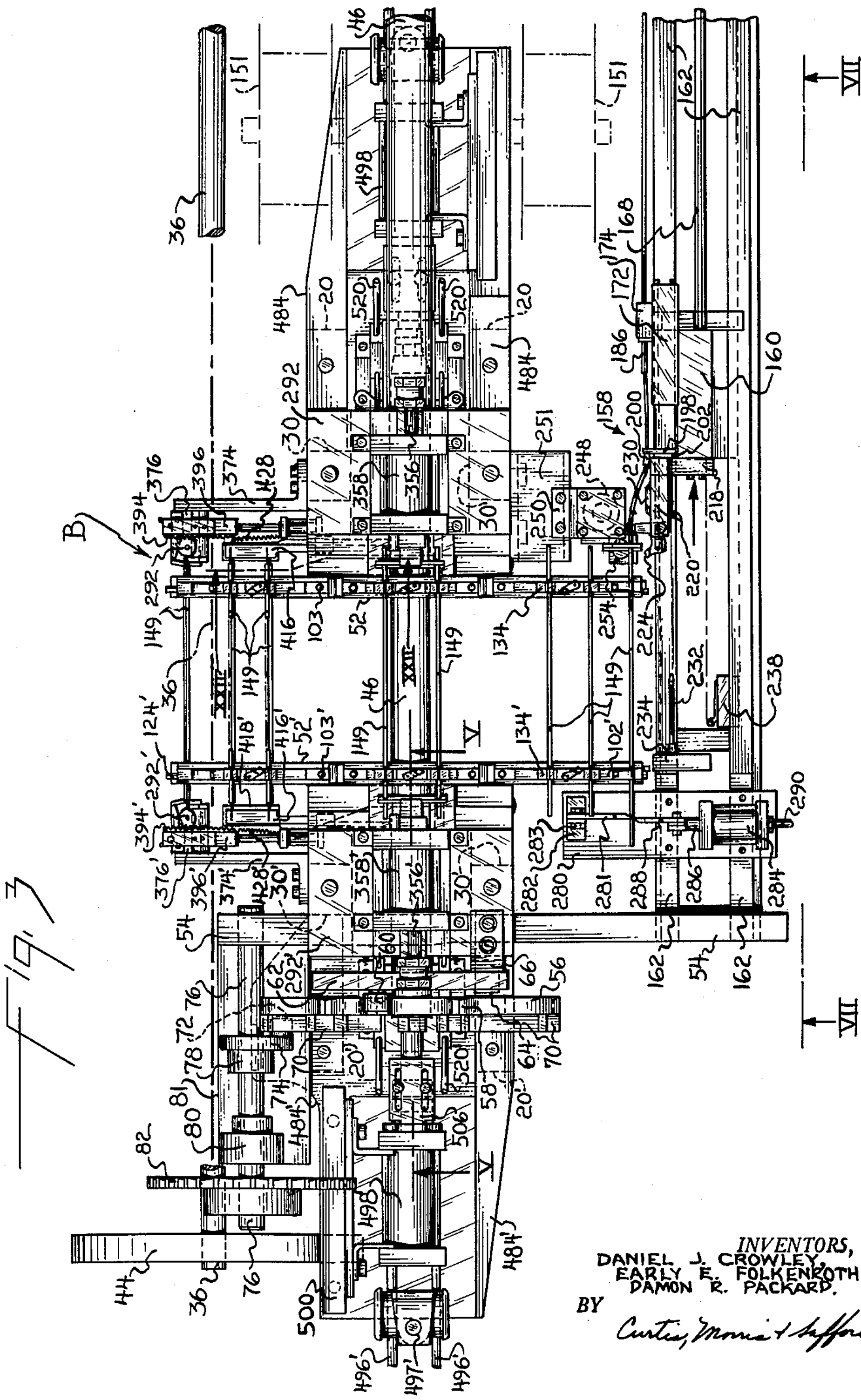
INVENTORS,
DANIEL J. CROWLEY,
EARLY E. FOLKENROTH &
DAMON R. PACKARD.
BY
Curtis, Morris & Safford

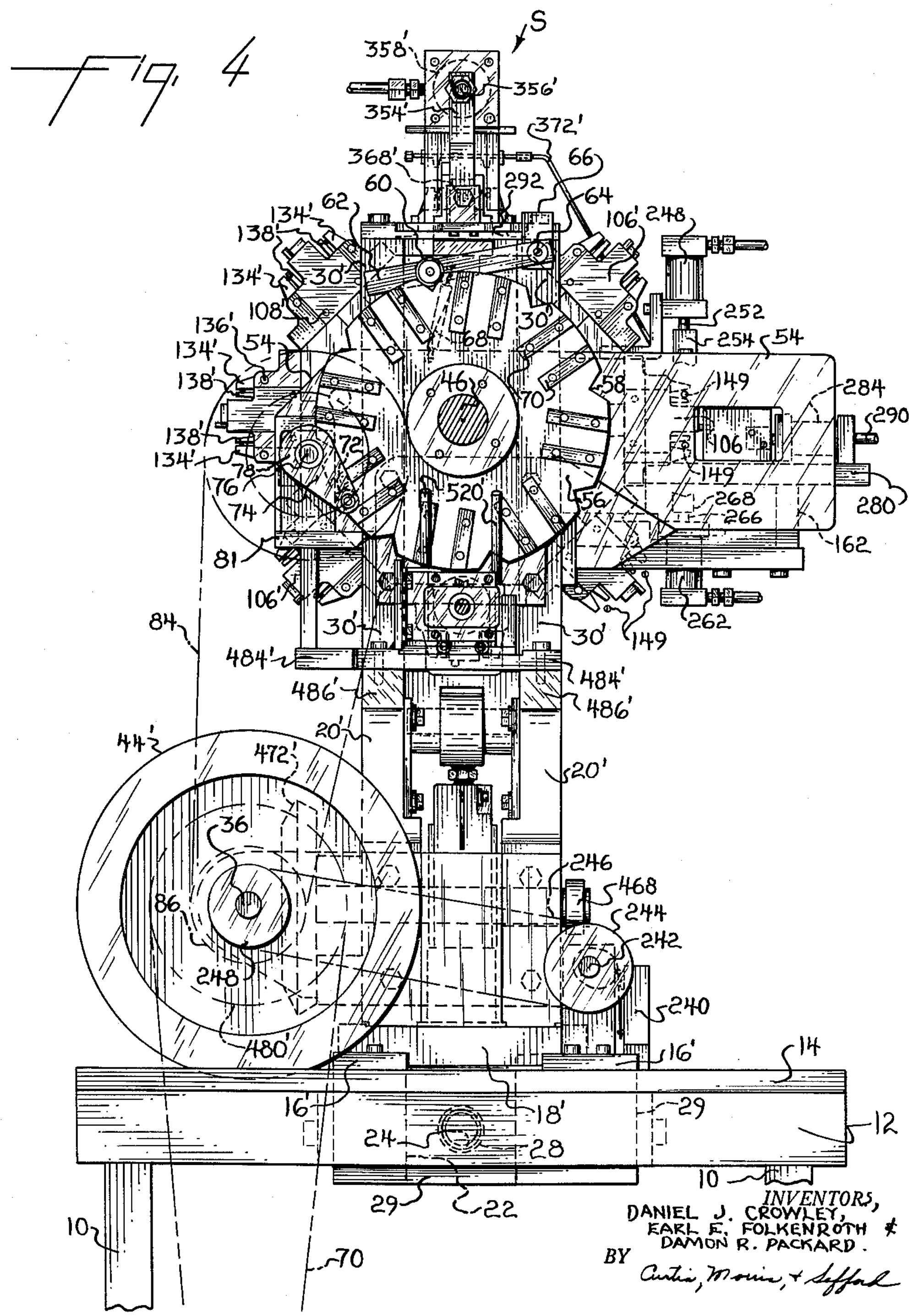
INVENTORS,
DANIEL J. CROWLEY,
EARL F. FOLKENROTH &
DAMON R. PACKARD.
BY
Curtis, Morris, & Safford

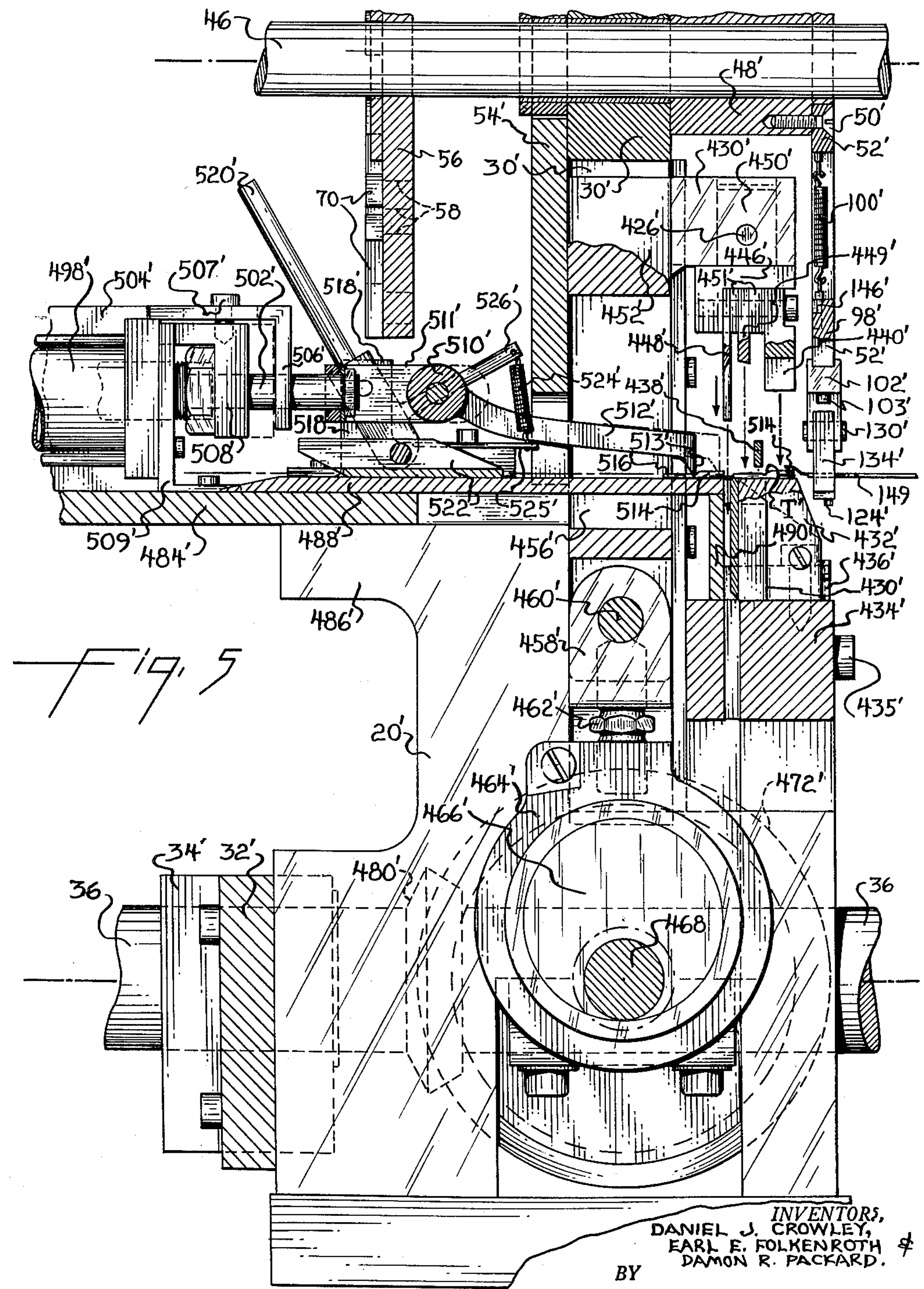
INVENTORS,
DANIEL J. CROWLEY,
EARL E. FOLKENROTH &
DAMON R. PACKARD.
BY
Curtis, Morris & Safford

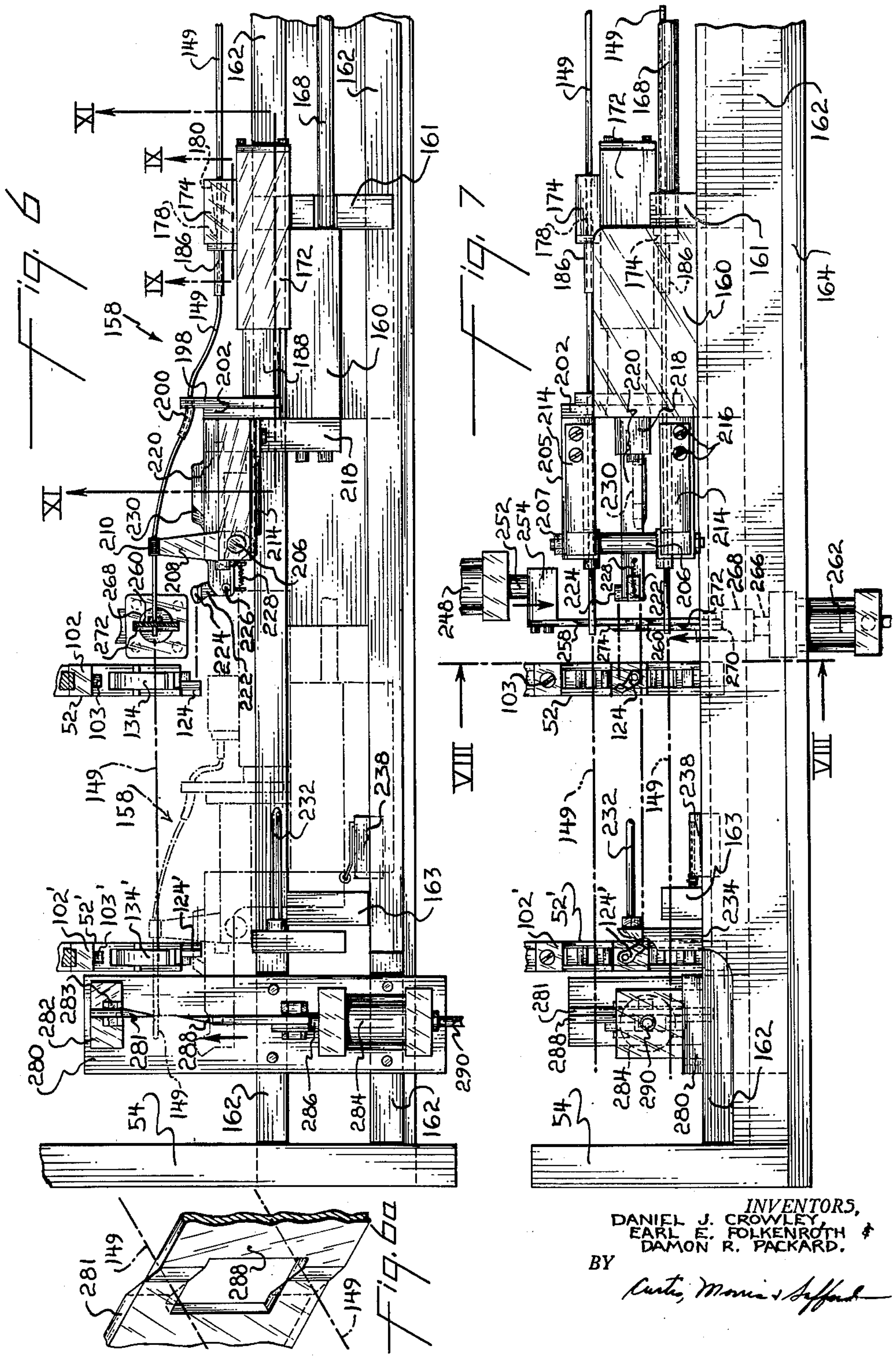
INVENTORS,
DANIEL J. CROWLEY,
EARL E. FOLKENROTH &
DAMON R. PACKARD.
BY
Curtis, Morris & Safford APPARATUS FOR SEVERING ELECTRICAL LEADS FROM A CONTINUOUS WIRE SOURCE
Filed Feb. 6, 1957 14 Sheets-Sheet 7
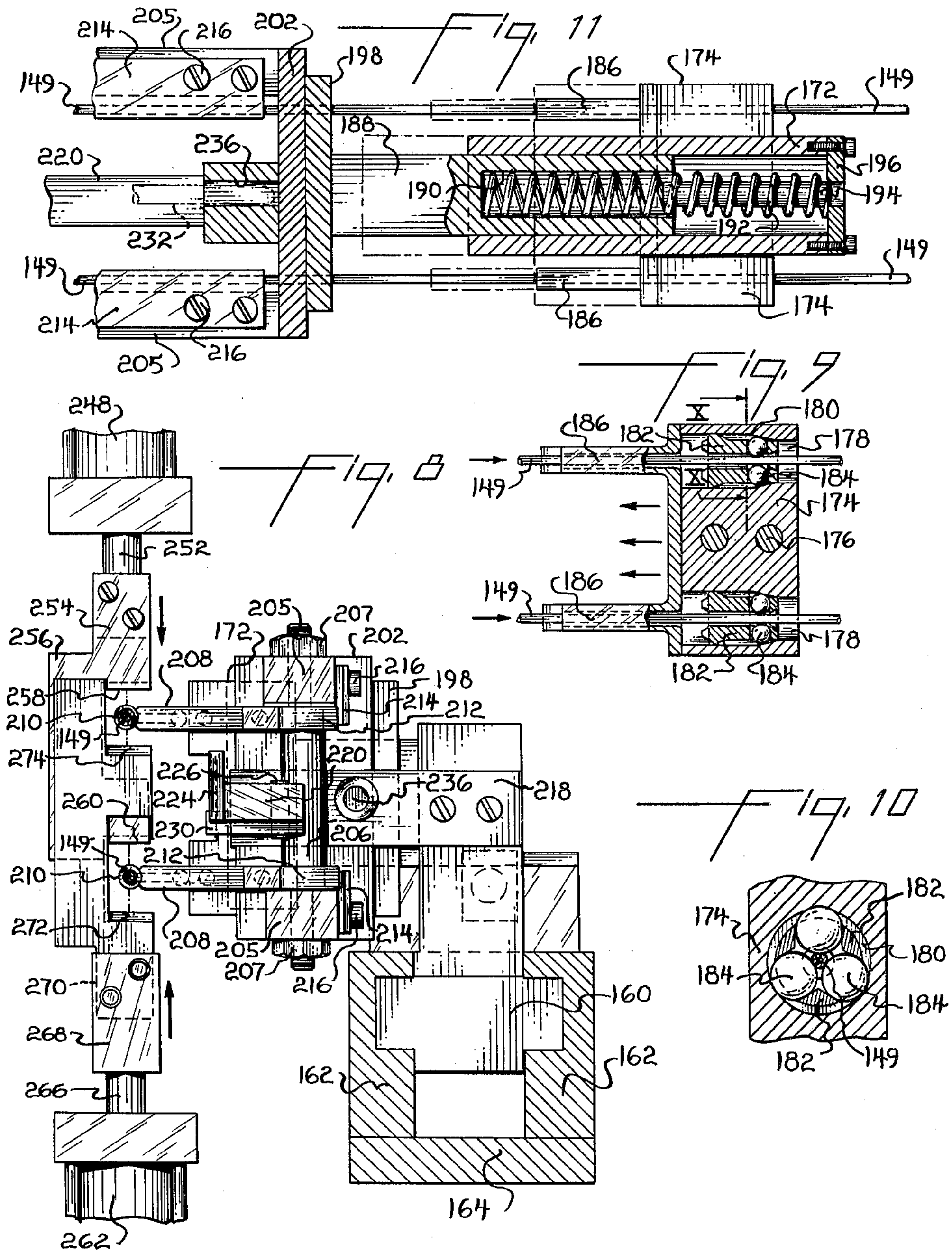
INVENTORS,
DANIEL J. CROWLEY,
EARL E. FOLKENROTH &
DAMON R. PACKARD.
BY
Curtis, Morris & Safford

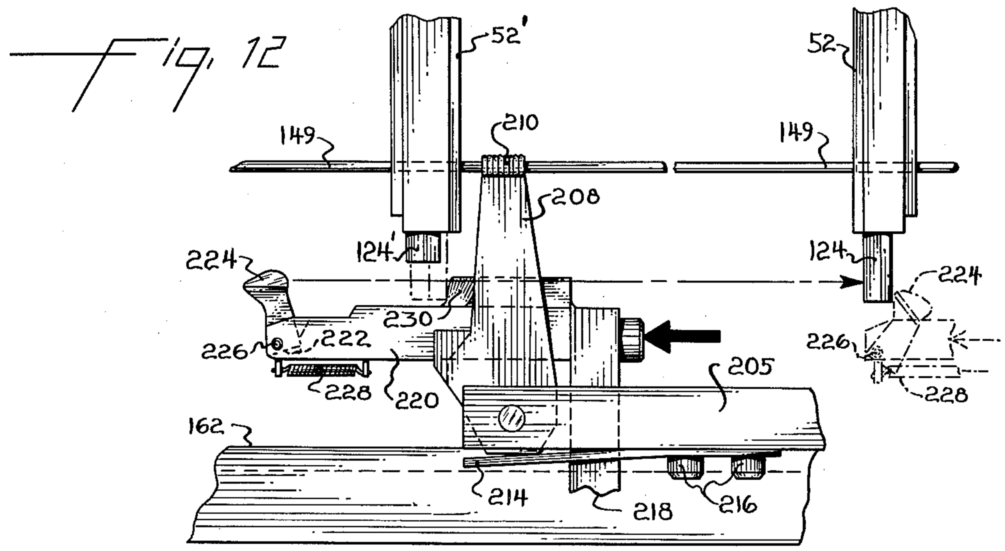
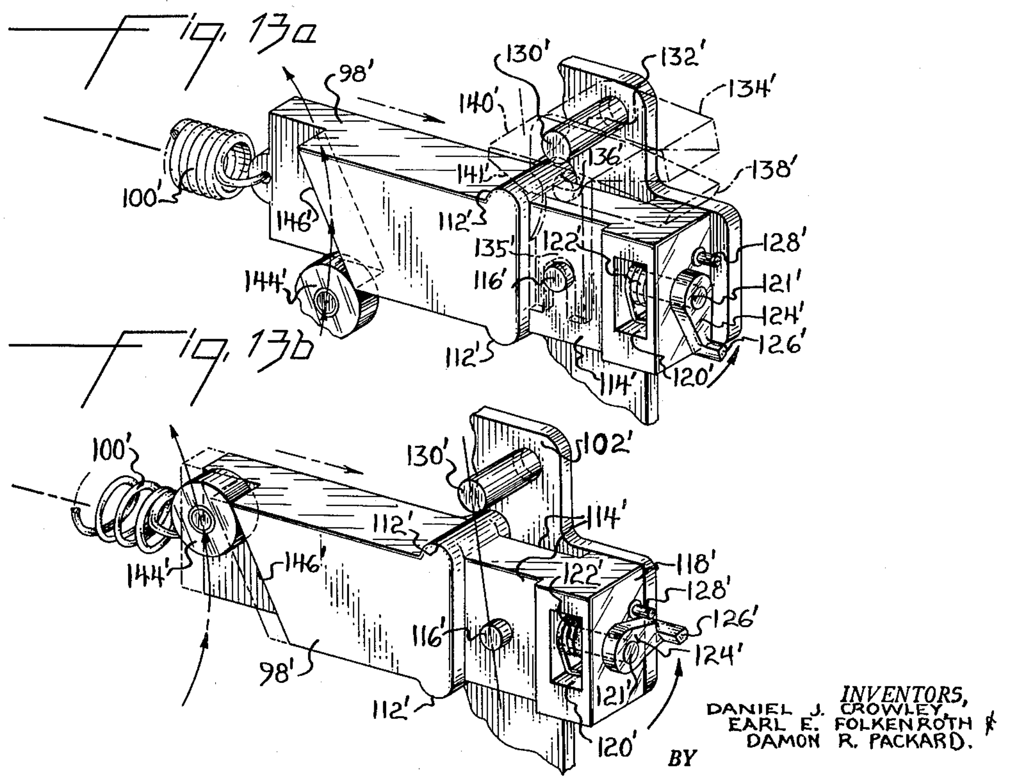
INVENTORS,
DANIEL J. CROWLEY,
EARL E. FOLKENROTH &
DAMON R. PACKARD.
BY
Curtis, Morris & Safford INVENTORS,
DANIEL J. CROWLEY,
EARL E. FOLKENROTH &
DAMON R. PACKARD.
BY
Curtis, Morris & Safford INVENTORS,
DANIEL J. CROWLEY,
EARL E. FOLKENROTH &
DAMON R. PACKARD.
BY
Curtis, Morris & Safford

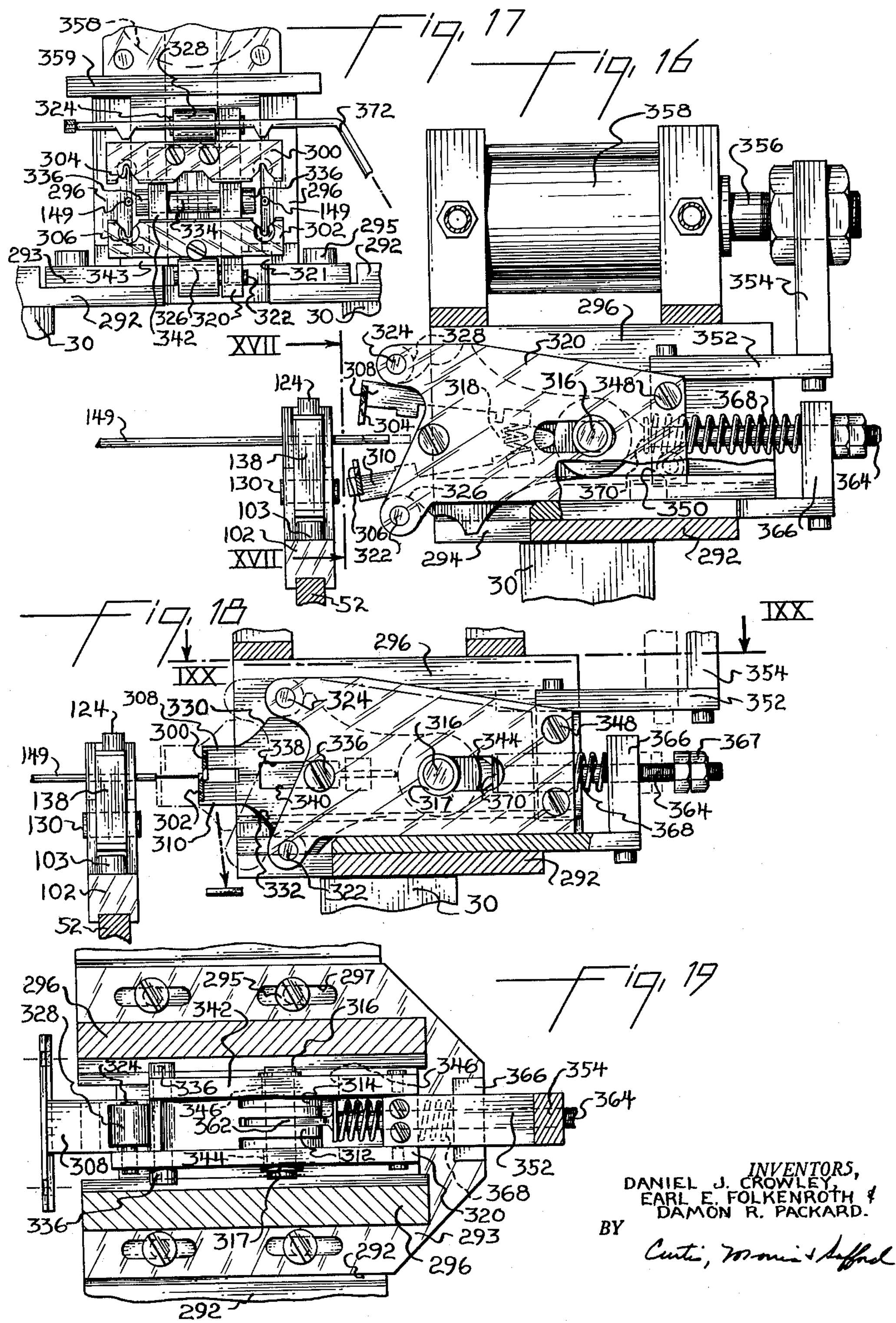
INVENTORS,
DANIEL J. CROWLEY,
EARL E. FOLKENROTH &
DAMON R. PACKARD.
BY
Curtis, Morris & Safford

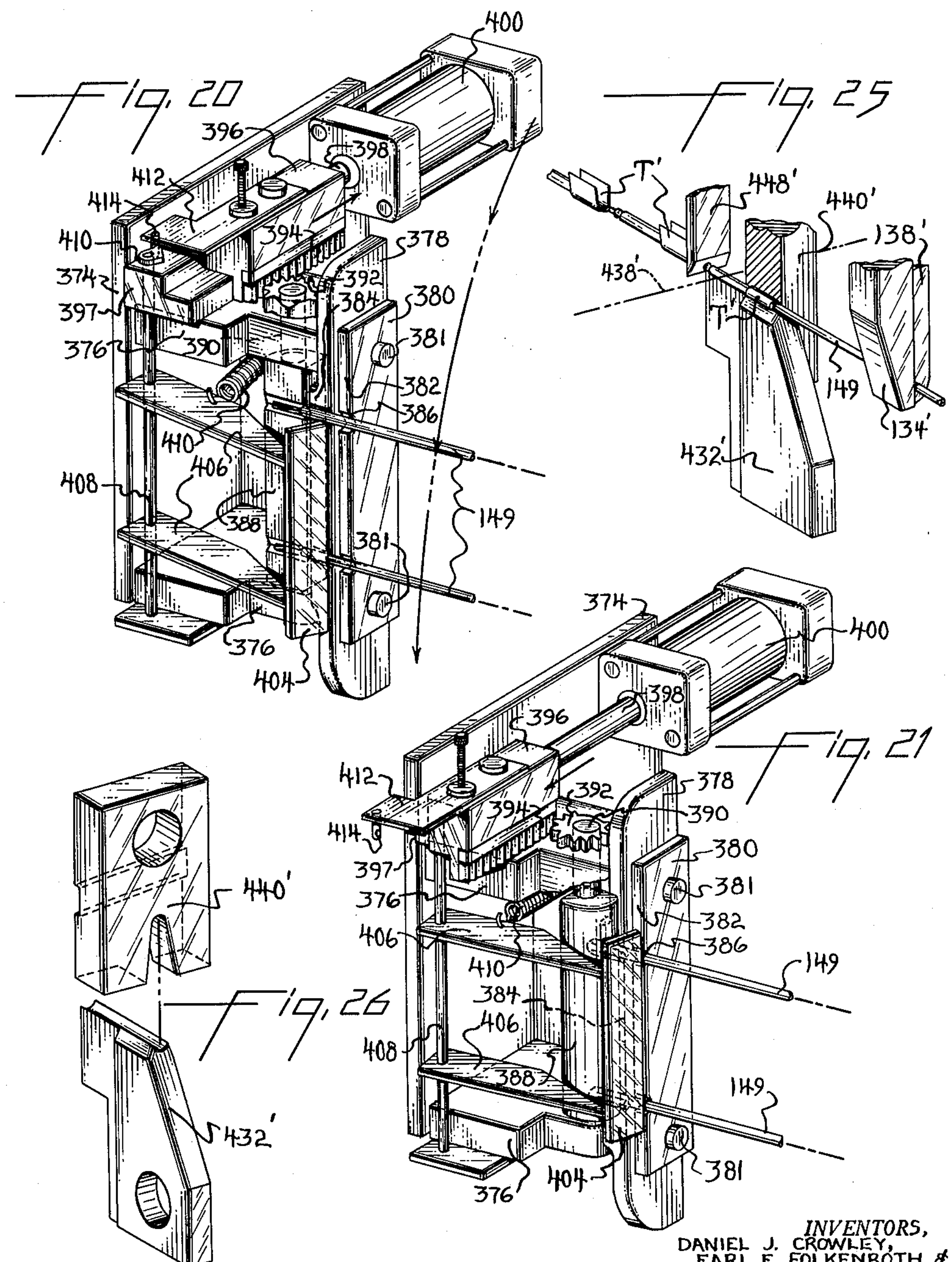
INVENTORS,
DANIEL J. CROWLEY,
EARL E. FOLKENROTH &
DAMON R. PACKARD.
BY
Curtis, Morris & Safford Jan. 30, 1962 D. J. CROWLEY ETAL 3,018,679
APPARATUS FOR SEVERING ELECTRICAL LEADS FROM A CONTINUOUS WIRE SOURCE
Filed Feb. 6, 1957 14 Sheets-Sheet 13
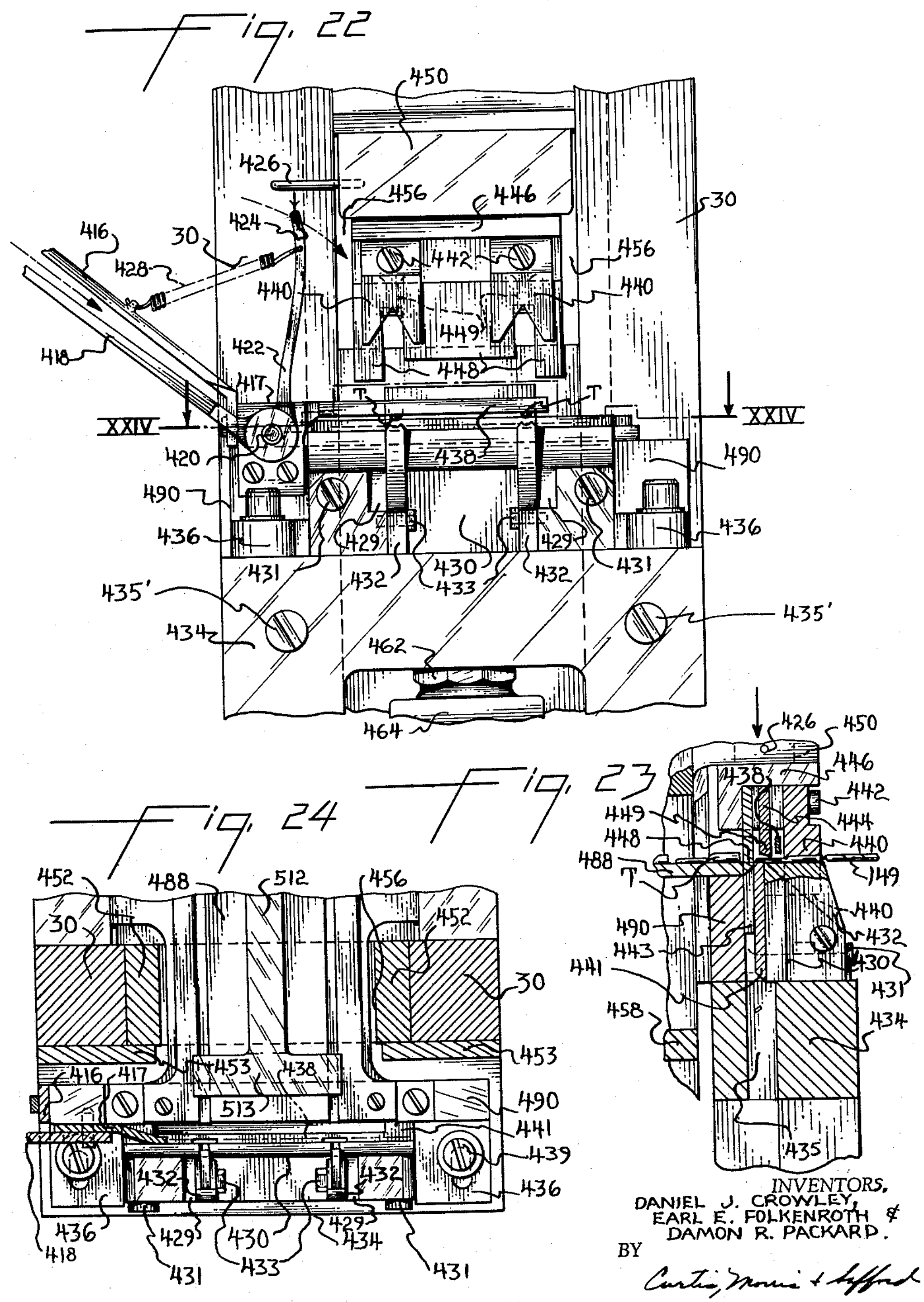
INVENTORS,
DANIEL J. CROWLEY,
EARL E. FOLKENROTH &
DAMON R. PACKARD.
BY Curtis, Morris & Safford APPARATUS FOR SEVERING ELECTRICAL LEADS FROM A CONTINUOUS WIRE SOURCE
Filed Feb. 6, 1957
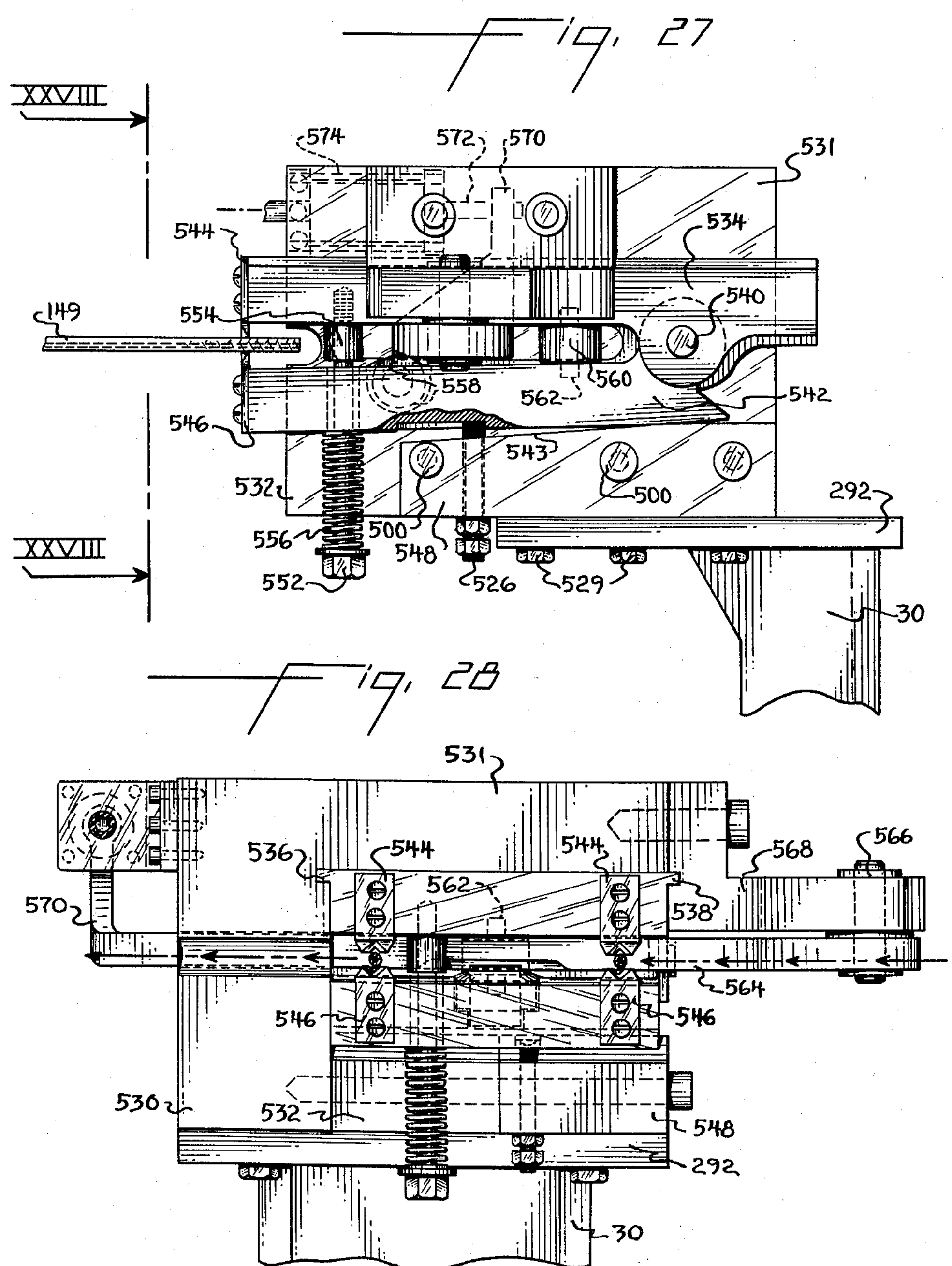
INVENTORS,
DANIEL J. CROWLEY,
EARL E. FOLKENROTH &
DAMON R. PACKARD.
BY
Curtis, Morris & Safford United States Patent Office 3,018,679

Patented Jan. 30, 1962

3,018,679

APPARATUS FOR SEVERING ELECTRICAL LEADS FROM A CONTINUOUS WIRE SOURCE

Daniel J. Crowley, Steelton, Earl E. Folkenroth, Paxtang, and Damon R. Packard, Mount Joy, Pa., assignors to AMP Incorporated, Harrisburg, Pa.

Filed Feb. 6, 1957, Ser. No. 638,550

3 Claims. (Cl. 83—154)

This invention relates to a method and apparatus for making electrical leads.

An object of the invention is to provide a lead making method and fully automatic machine capable of producing leads having insulation stripped from each end thereof and having terminals crimped onto each of the stripped ends.

A further object is to provide a versatile lead making machine adaptable to crimp various types of terminals onto wire ends such as those types adapted to be crimped onto stripped lead ends and those types (insulation piercing types) adapted to be crimped onto unstripped lead ends. Also within the purview of this object of versatility is the provision of a method and machine adaptable to operation with terminals having oversize connector ends such as oversized ring tongues.

A further object is the provision of a machine embodying improved wire feeding, lead gripping and lead transfer means.

These and other objects are attained in our method of manufacturing leads by feeding wire in an axial direction, clamping or gripping the end portion of the wire at spaced apart locations near the end, severing the gripped section of wire to form a lead, and then successively positioning the lead at various operating stations, which can include an insulation stripping station, a bending station and a crimping station, by intermittently moving it along a path extending normally of the direction of wire feed. The apparatus embodiment of the invention takes the form of a pair of spaced parallel discs or plates on the edges of which are mounted lead gripping jaws. Wire feeding means are mounted in such manner as to feed wire along a path extending normally of the planes of the discs and to the lead gripping jaws, the wire feeding means and the jaws being constructed in such manner as to cooperate during the wire feeding portion of the operating cycle to effect closure of the jaws into gripping relationship with the fed wire. The lead severing, insulating stripping, crimping and other mechanisms are positioned adjacent the discs around the periphery thereof so that intermittent rotation of the discs delivers the lead ends to these various mechanisms for successive operations.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 2 is a view taken along the line II—II of FIGURE 1;

FIGURE 3 is a view taken along the line III—III of FIGURE 1 but omitting some of the components of the machine in the lower portions thereof in the interest of clarity;

FIGURE 4 is a view taken along the line IV—IV of FIGURE 1;

FIGURE 5 is a sectional view taken along the line V—V of FIGURE 3;

FIGURE 6 is a fragmentary top plan view showing the wire feed mechanism of the disclosed apparatus embodiment;

Figure 14:
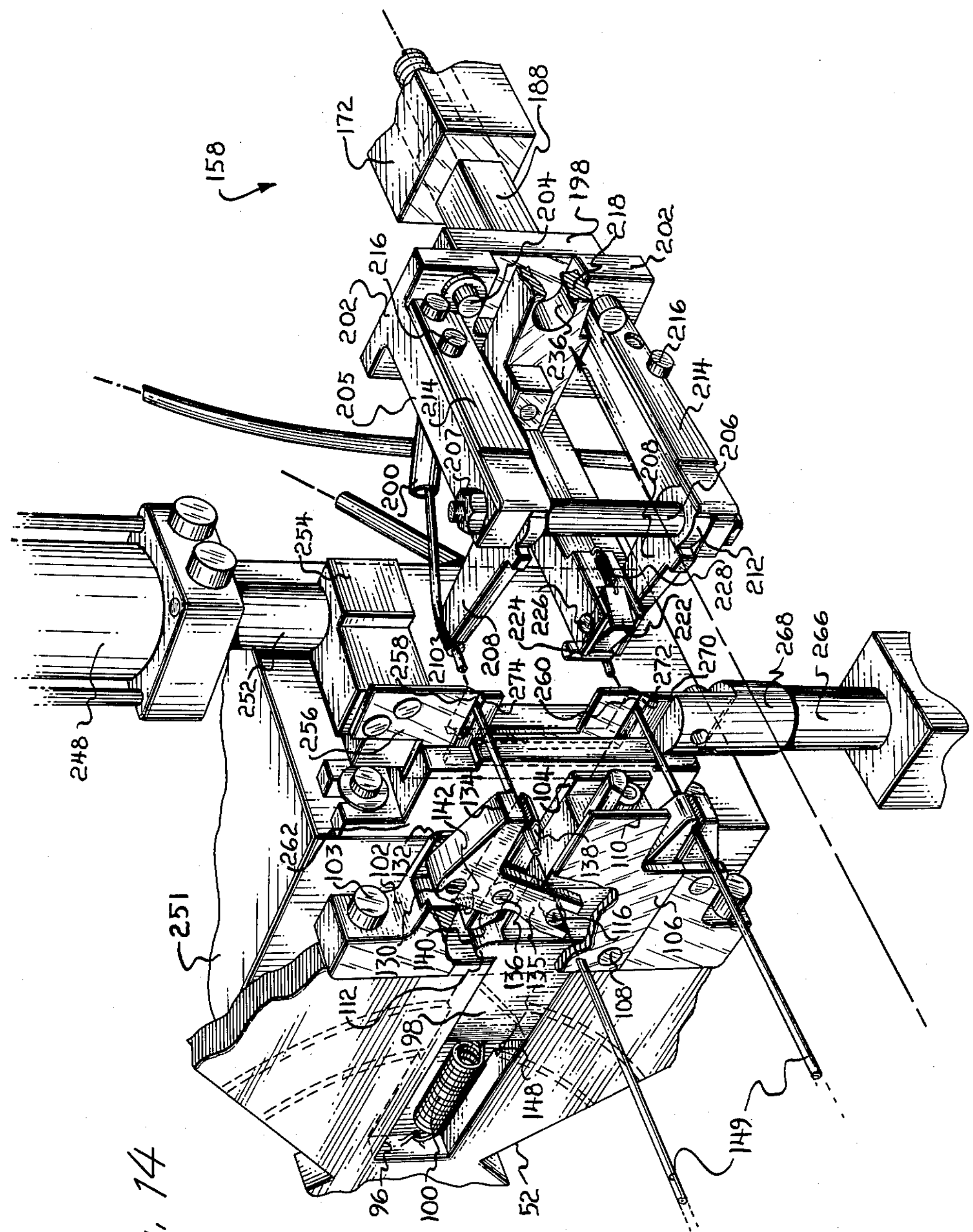
Figure 15:
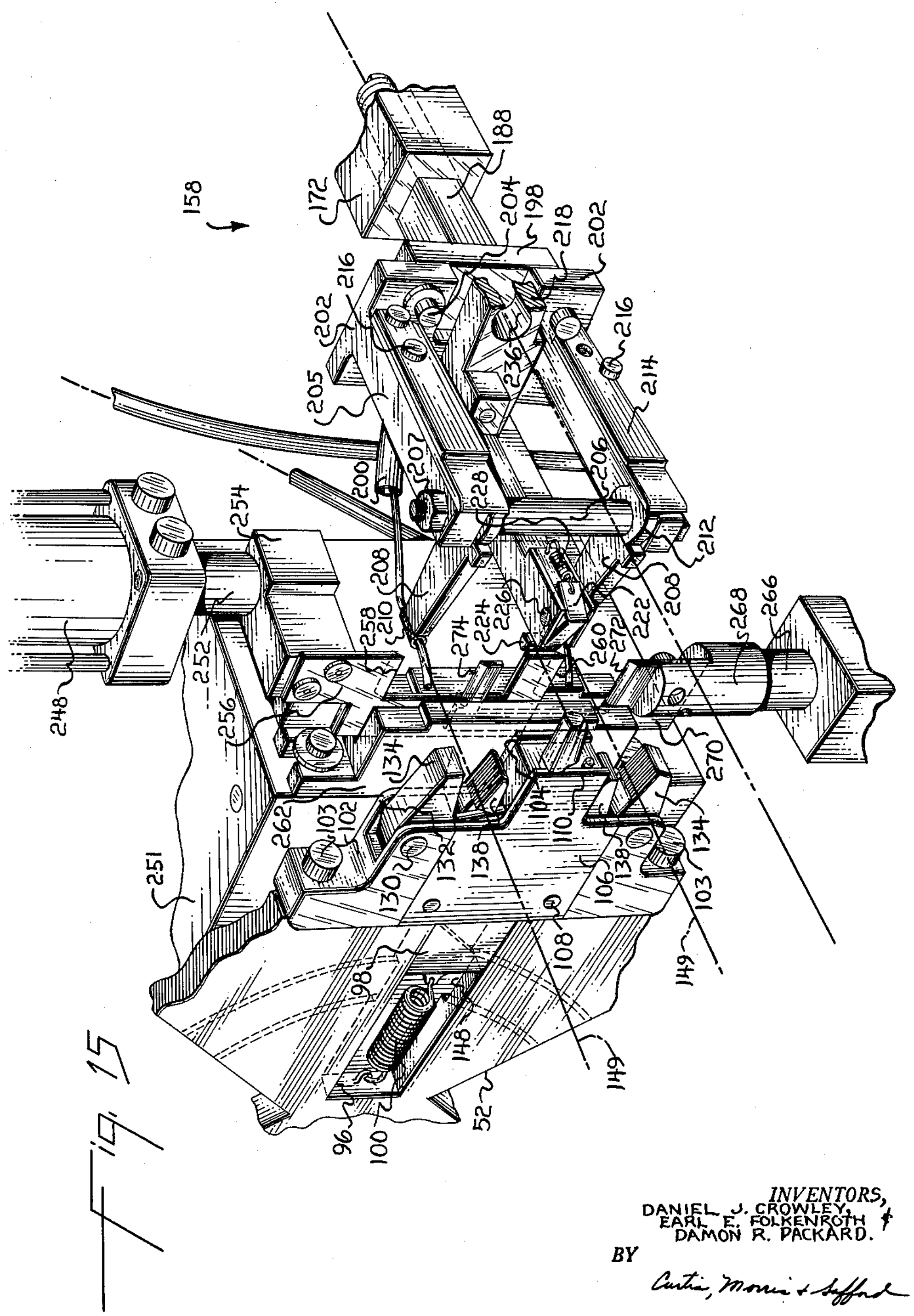

FIGURE 6*a* is a fragmentary perspective view of one of the sets of wire cutting blades shown in FIGURE 6;

FIGURE 7 is a frontal view of the structure shown in FIGURE 6 and taken along the line VII—VII of FIGURE 3;

FIGURE 8 is a view taken along the line VIII—VIII of FIGURE 7;

FIGURE 9 is a view taken along the line IX—IX of FIGURE 6;

FIGURE 10 is a sectional view taken along the lines X—X of FIGURE 9;

FIGURE 11 is a view taken along the lines XI—XI of FIGURE 6;

FIGURE 12 is an enlarged fragmentary plan view showing the construction of the end portion of the wire feed mechanism and illustrating the manner in which the lead gripping jaws are actuated by this mechanism;

FIGURES 13*a* and 13*b* are perspective fragmentary views showing the operation of a lead gripping means;

FIGURES 14 and 15 are fragmentary perspective views showing portions of the lead gripping mechanism, the lead severing mechanism, and the wire feed mechanism and illustrating the manner in which these parts cooperate during operation of the apparatus;

FIGURE 16 is a side view, partly in section, of the insulation stripping mechanism;

FIGURE 17 is a frontal view of the insulation stripping mechanism taken along the lines XVII—XVII of FIGURE 16;

FIGURE 18 is a view similar to FIGURE 16 and showing the operation of the insulation stripping mechanism;

FIGURE 19 is a view taken along the lines XIX—XIX of FIGURE 18;

FIGURES 20 and 21 are perspective views illustrating the operation of the lead end bending mechanism which forms part of the invention;

FIGURE 22 is a frontal view of the crimping dies of the apparatus and showing their relationship to the crimping press;

FIGURE 23 is a sectional view of the crimping mechanism shown in FIGURE 22 and showing the crimping dies in their bottomed position;

FIGURE 24 is a view taken along the lines XXIV—XXIV of FIGURE 22 and showing the lower crimping dies in plan view;

FIGURE 25 is a perspective view, partially in section, showing the relationships between the die set, the lead gripping means, and the slug out blade, and illustrating the positions occupied by the parts when the terminal is crimped onto the end of the lead;

FIGURE 26 is a perspective view of the crimping die set of the disclosed embodiments;

FIGURE 27 is a side view of an alternative insulation cutting and stripping mechanism; and FIGURE 28 is a front view taken along the line XXVIII—XXVIII, of the mechanism of FIGURE 27.

Referring to FIGURES 1–5, the reference numerals 10 denote the legs of a supporting bench for the apparatus which provides suitable cross members or aprons 12 and a top surface 14. A set of parallel rails 16 extends for a substantial distance on top surface 14 and slidably accommodates a plate 18 upon which is mounted a press housing 20. On its under side plate 18 provides a depending boss 22 which extends downwardly between rails 16 through a suitable elongated slot in top surface 14 of the supporting bench. This boss threadedly receives a power screw 24 having a crank 26 on one end thereof and is journalled as at 28 at its opposite end in a fixed cross member 29 so that upon rotation of crank 26, boss 22 is moved leftwardly or rightwardly in FIGURE 1 to change the position of press housing 20; for example to the phantom line position shown in FIGURE 1. As will be apparent from the description which follows, by virtue of this arrangement, leads of any design or length can be produced by the instant apparatus.

Figure 1:
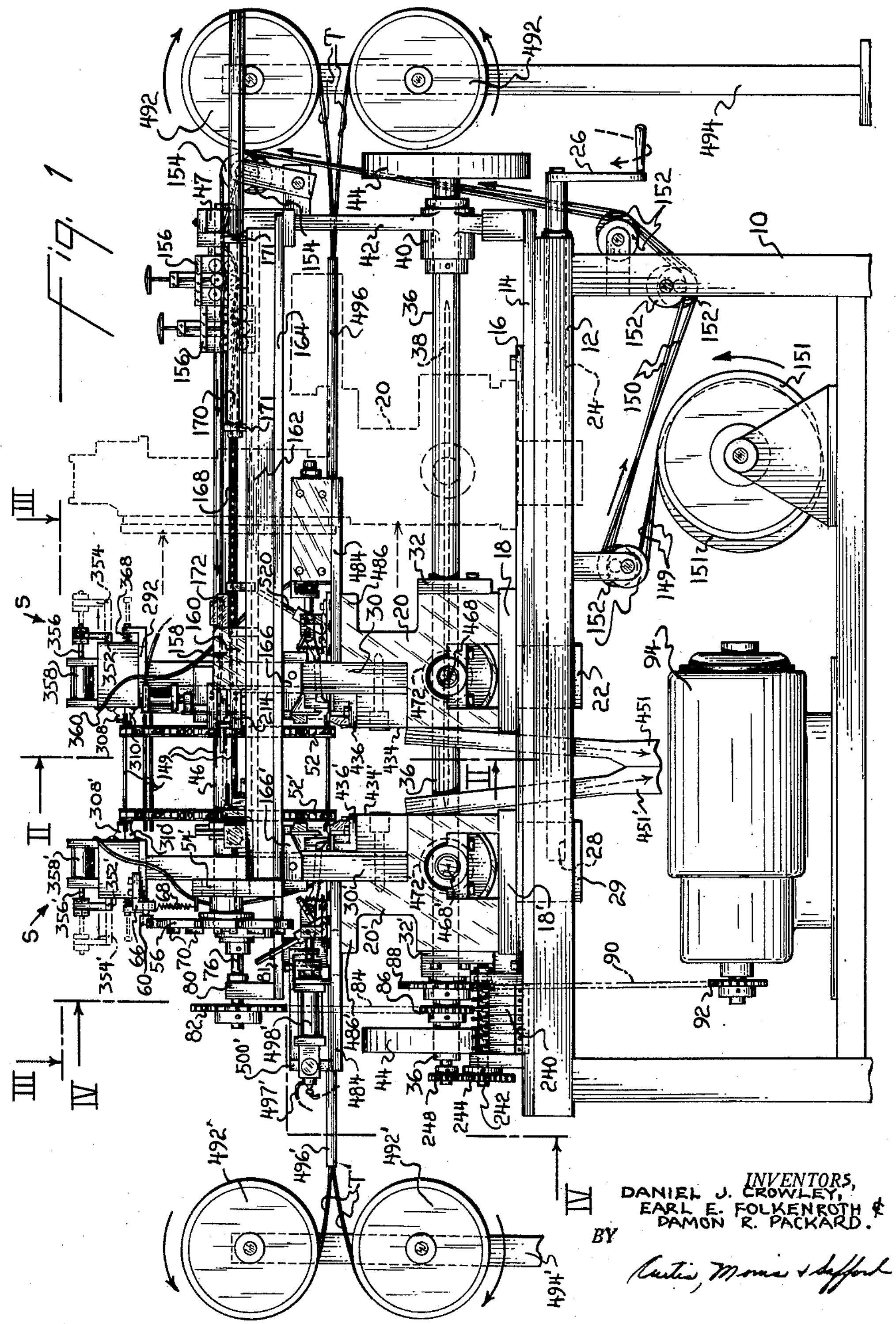
FIGURE 1 is a frontal view of a preferred apparatus in accordance with the invention.

A plate 18' is secured to rails 16 at the left hand end thereof as viewed in FIGURE 1 and has mounted thereon a housing 20' similar to housing 20 and in spaced relationship thereto. It should be mentioned at this point that the housings 20, 20' are substantially similar and each has secured thereto various mechanisms and structural elements for stripping, bending, and crimping the opposite ends of the severed leads and these mechanisms are for the most part, substantially similar. In the interest of facility of description, only one mechanism of the pairs will be described in some of the descriptions which follow (usually the mechanism on the right in FIGURE 1 associated with disc 52) and similar reference numerals differentiated by prime marks will be used to denote corresponding elements of the mechanisms carried by the two press housings.

Bearing supports 32, 32' extend rearwardly, as viewed in FIGURE 1, from housings 20, 20' and provide on their ends bearings, one of which is shown at 34' in FIGURE 5, for a main power shaft 36 which is also journalled for rotation in a bearing 40 extending from a fixed vertical supporting member 42. The ends of main power shaft 36 carry fly wheels 44 which insure continuous and smooth rotation of the shaft.

A pair of vertical supporting members 30 and a pair of similar members 30' are secured to and extend upwardly from housings 20 and 20', respectively, and these supports in their upper portions rotatably accommodate an upper intermittently rotatable shaft 46. Bearing means as shown at 54', FIGURE 5, are mounted in the vertical supporting members for the purpose of supporting shaft 46 and the shaft itself has keyed or otherwise secured thereto hubs, as shown at 48', connected by means of a fastener 50' to an octagonal disc 52'. It will be understood that the two discs 52, 52' are similarly mounted on upper shaft 46. On its left hand end as viewed in FIGURE 1, shaft 46 carries a Geneva wheel 56 notched at intervals of 45° around its periphery as denoted at 58. A roller 60 carried by an arm 62 pivoted at 64 to a bracket 66 is adaped to enter notches 58 and to yieldingly lock the wheel in a fixed position. To this end, a spring 68 is attached at one end to arm 62 and at its opposite end to a pin extending from a plate 54 which plate is secured to the left hand side of housing 20' (as viewed in FIGURE 3) and extends transversely of shaft 46. When roller 60 is seated in one of the notches 58 as shown in FIGURE 4, wheel 56 will be locked in position; however, this wheel can be rotated against the force of roller 60 and spring 68.

On one of the faces of plate 56 there are mounted sets of guide blocks 70 extending radially toward the axis of shaft 46 and between each pair of adjacent notches 58. These guide blocks are adapted to receive a roller 72 on the end of an arm 74 which extends from a hub 78 which is keyed or otherwise secured to a continuously rotating jack shaft 76. When jack shaft 76 completes a revolution, the roller 72 enters the guide way defined by one set of the blocks 70 and indexes the wheel 56 through an angle of 45°. Wheel 56 then remains stationary for a brief interval while the jack shaft 76 continues its rotational cycle, and until the roller is brought around to the next successive set of guide blocks.

Jack shaft 76 is rotatably supported at its right hand end (FIGURE 3) in plate 54 and near its left hand end by a bearing 80 which extends from a horizontal support plate 81. This horizontal support plate is secured to and extends from transverse plate 54. On its extreme left hand end, shaft 76 has keyed or otherwise secured thereto a sprocket 82 connected by means of a chain 84 to a sprocket 86 carried for rotation with main power shaft 36. The main power shaft is connected by means of a sprocket 88 and a chain 90 to a sprocket 92 on the end of a shaft of an electric motor 94 which is mounted below top surface 14 of the apparatus.

With this arrangement, continuously operating motor 94 continuously rotates main power shaft 36 and jack shaft 76 while upper shaft 46 is intermittently indexed through an angle of 45° by virtue of the Geneva wheel arrangement described above.

*The lead gripping mechanisms*

Each of the eight edges of each of the octagonal plates 52, 52' provides two sets of gripping jaws. The leads in the process of manufacture are gripped at each end by these jaws and are delivered successively to the stripping station, S, the bending station, B, and the crimping station, C, as described below. These lead gripping mechanisms will now be described with particular reference to FIGURES 2, 14, and 15, which show the right hand gripping mechanisms on disc 52 and FIGURES 13*a* and 13*b* which show the left hand gripping mechanisms on disc 52'.

Disc member 52 is slotted radially as indicated at 96, the slot extending from near the hub of the disc outwardly towards each of the edges. These slots accommodate reciprocable slide members 98 which are normally radially inwardly biased by means of a coil spring 100 secured at one end to the base of slide 98 and at the opposite end at the base of the slot. Hollow open sided housings 102 are secured to the edges of the disc by fasteners 103 and each housing provides a central radial extension 104. The opposite side of the housing is open as indicated in FIGURE 14 but is covered by a plate 106, secured in place by fasteners 108 and providing an extension 110 which is complementary to extension 104. Slide member 98 provides cam shoulders 112 intermediate its ends which, as shown in FIGURE 14, abut the base of housing 102 when the slide in it is in its retracted position and thereby limit inward radial movement of the slide.

Referring particularly to FIGURES 13*a* and 13*b*, adjacent these cam shoulders the slide member is relieved on each side thereof, as indicated at 114', the relieved portion separating the shoulders from the end portion 118' of the slide. End portion 118' is apertured at 120' and rotatably accommodates a pin 121' which extends through opening 120' and through the end wall of the slide. The end of this pin has secured thereto an arm 124' having a lateral extension 126' on the end thereof. Within aperture 120', a torsion spring 122' is fitted in surrounding relationship to pin 121' and normally biases this pin and arm 124' in a counterclockwise direction as viewed in FIGURE 13*a*. The motion of arm 124' along a counterclockwise path is limited by a stop pin 128' which extends from the end of the slide member and arm 124 is of such length that when the slide member is urged radially outwardly, the arm will extend over the edge of extension 104' thereby locking the slide member in position and against the contractive force of spring 100'.

On each side of slide member 98, a fixed pin (130 in FIGURE 14, 130' in FIGURE 13*a*) extends through the central hollow portion of housing 102, 102' and pivotally accommodates a bell crank lever 132, one arm 134 of which constitutes one of the jaws of the lead gripping mechanism. The other arm 135 of this bell crank is bifurcated and fits into one of the cut out portions 114 in surrounding relationship to a pin 116 which is integral with the slide member and which extends from the base of cut out portion 114. It will be apparent from FIGURES 13*a*, 13*b* and 14 that the upper one of the bell crank levers fits into the left hand one of the cut out portions 114 on the slide member while the lower bell crank lever similarly fits within the right hand one of the cut out portions and is hidden from sight in these views. However, since both sets of gripping jaws and mechanisms in each housing are constructed substantially alike this description of the upper one of the gripping jaw sets (as viewed in FIGURE 14) will suffice.

Figure 2:
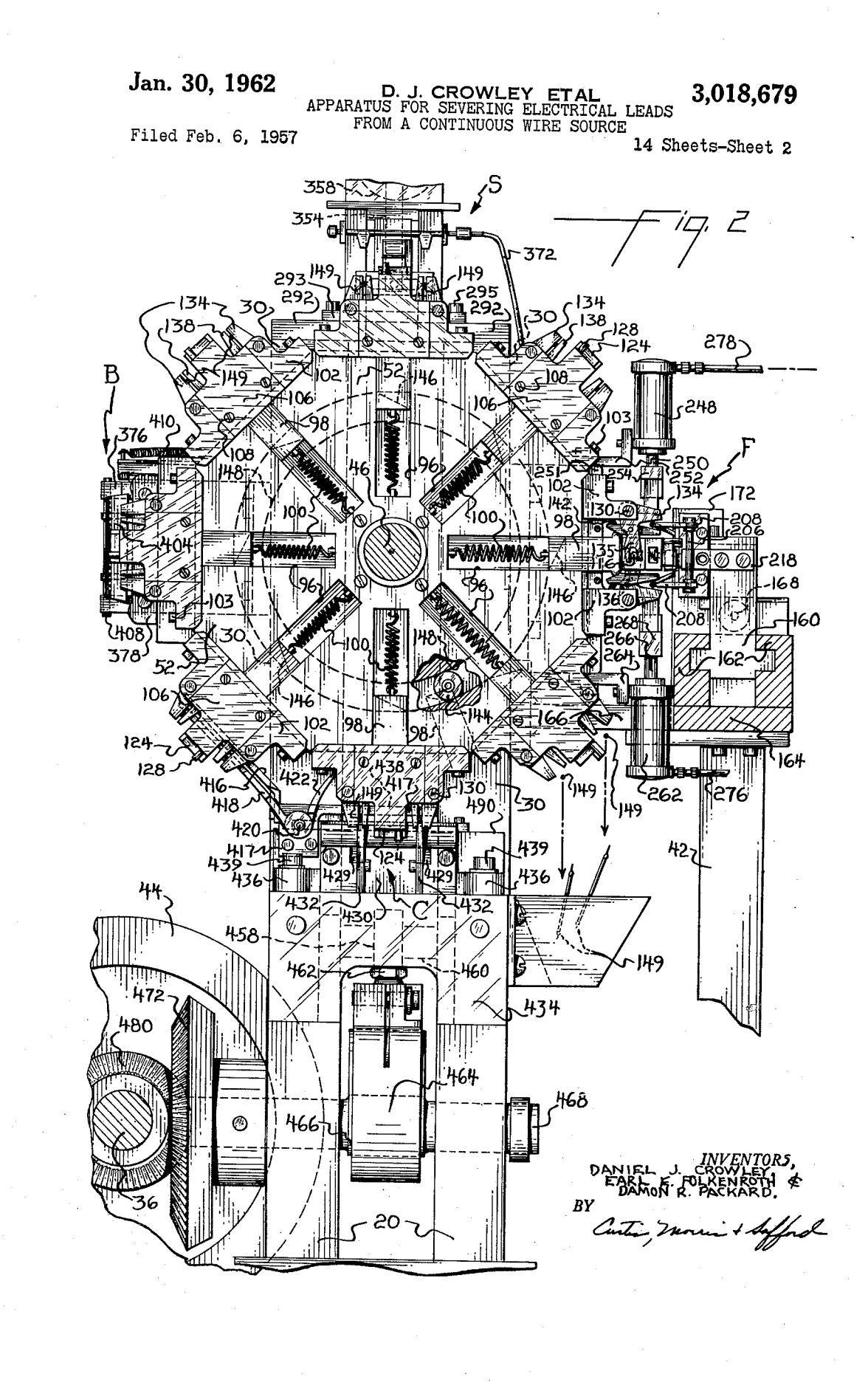

Between pin 130 and the side of slide member 98 there is provided a floating lever which is pivotally carried by a pin 136 extending from arm 135 of the bell crank. The forward end 138 of this lever functions as a gripping jaw in cooperation with the arm 134 of the bell crank, while the rearward end 140 of this lever provides a camming surface 141 which is contacted by camming shoulders 112 in a manner described below. A compression spring 142, shown best in FIGURE 2, is interposed between the interior surface of housing 102 and the surface of the rearward end 140 of the floating lever and normally biases the floating lever in a counterclockwise direction around pivot pin 136 as viewed in FIGURE 14 and urges it into lead gripping engagement with the upper jaw 134.

As previously mentioned, slide members 98 are normally biased radially inwardly by coil spring 100 and when the slide members are so positioned (i.e. the position of FIGURE 14 with camming shoulder 112 abutting the base of housing 102) the camming shoulder 112 will be out of engagement with camming surface 141. Under these conditions, the relationship of pin 116 to pivotal axis 130 is such that the bell crank is in the position shown of FIGURE 14 while floating lever 138 is biased into lead gripping engagement with the bell crank by virtue of spring 142. However, when the slide member 98 is moved radially outwardly from the position of FIGURE 14, the motion of pin 116 causes the bell crank to be oscillated in a counterclockwise direction and out of engagement with the lead. At the same time, radial outward motion of the slide member forces camming shoulder 112 against camming surface 141 of the floating lever and as a result the floating lever is rotated in a clockwise direction about its pivot pin 136 thereby moving the lead gripping jaw 138 of this lever away from its counterpart 134. It will thus be apparent that when the slide member 98 is in its retracted position the jaws are urged against each other into gripping engagement with a lead and if the slide member is moved radially outwardly the jaws are urged apart to release the lead.

This radial motion of the slide member 98 is achieved by means of a roller 144 which is affixed to vertical member 30. The roller fits within a circular groove 148 on the face of disc 52 and engages a camming surface 146 on the rearward end of the slide member. The rollers are located between the crimping station indicated by the letter "C" in FIGURE 2 and the wire feed station indicated by the letter "F" so that as each set of lead gripping mechanisms is indexed from the crimping station to the wire feed station, the gripping jaws are opened by the action of cams 144, 144′ thereby to release the finished leads and deposit them in a container 149.

The arrangement of cam rollers 144, 144′ and the camming surfaces 146, 146′ is such that the slide members 98, 98′ will be urged radially outwardly to a position such that arm 124 will swing over the edge of extension 104 of the housing. When the arm swings in this direction and to this extent, the slide members are locked temporarily in their extended positions and the jaws are maintained open. The jaws are subsequently closed onto leads by movement of the arms 124 in a clockwise direction against the force of torsion springs 122 as is explained below in connection with the description of the wire feed mechanism.

It should be pointed out that while the lead gripping mechanisms on the two discs 52, 52′ are substantially alike, the latching levers 124, 124′ are positioned somewhat differently on the two discs. Referring particularly to FIGURE 7, in the position of the part shown in this figure the slide members 98, 98′ are locked in their outward positions and the jaws are opened. It will be noted that the latching lever 124 on disc 52 is so positioned on its shaft 121 that it is adapted to be moved along a clockwise path toward the right to release the slide member and close the jaws, while the latching lever 124′ associated with disc 52′ is so positioned that it is adapted to be moved to the left in a clockwise direction in order to release the slide member and close the jaws. In other words, the two latching pins are secured to their shafts at diametrically opposite positions. The significance of this feature will be apparent from the description of the wire feeding mechanism which follows.

*The wire feed mechanism*

Referring now to the FIGURES 1–3 and 6–11, two separate wires 150 are supplied from a suitable substantially endless source such as reels 151 and are guided by means of suitable guide pulleys 152 to a set of pulleys 154 on the upper portion of vertical support member 42. Pulleys 152, 154 are advantageously journalled near each other or one on top of each other so that the wire can be led from these pulleys along substantially parallel paths through sets of tensioning and straightening rollers 156. The wires extend from the rollers 156 in superimposed relationship in a vertical plane to a reciprocable wire feeding mechanism denoted generally by the reference numeral 158.

This wire feeding mechanism comprises a block 160 which is reciprocable between a pair of opposed rails 162 having grooves which receive projections on the sides of the block. Rightward travel of block 160 (as viewed in FIGURE 6) is limited by a stop 161 and leftward travel of this block is limited by a similar stop 163. Rails 162 rest upon an elongated base member 164 which extends for substantially the full length of the apparatus as shown in FIGURE 1 and which is supported at one end on a ledge extending from vertical support 42 and is also supported by members 166, 166′ which extend from vertical members 30, 30′. A piston rod 168 is secured to block 160 at its right hand end as viewed in FIGURES 6 and 7 and extends to a piston within a cylinder 170 mounted on the right hand end of the machine as indicated at 171 FIGURE 1. Block 160 carries on its side toward the central portion of the apparatus a hollow housing 172 which in turn has secured thereto by means of fasteners 176 a collet housing 174. As shown best in FIGURE 6 the collet housing is mounted inwardly of housing 172 and provides apertures 178 through which the conductors from the source of wire extend. Apertures 178 provide sloping surfaces as indicated at 180 which connect a portion of a larger diameter with the end portion of smaller diameter and the larger diameter portions of these apertures receive collets 182 having ball bearings 184 theerin. The conductors from the source of wire extend through the collets and between the three ball bearings in the embodiment shown, and through wire guides 186 which project from the left hand portion of the collet housing as viewed in FIGURE 11. With this arrangement on leftward movement of the collet housing, as viewed in FIGURES 9 and 11, the collets are urged rightwardly relative to the collet housing, as a result of the friction of the wire on the ball bearings, and the sloping surfaces 180 cam the ball bearings 184 into tight gripping engagement with the wire. Thus the wire is pulled from the reels during such leftward movement of the collet housing. On rightward movement of the collet housing however, the collets are urged relatively leftwardly within their apertures and out of engagement with camming surfaces 180 so that the grip of the ball bearings on the wire is released and the collet housing is permitted to move over the wire without carrying the wire along with it. The significance of this aspect of the invention will be apparent from the description of the operation of the wire feed mechanism given below.

Housing 172, described above, internally receives a slide member 188 which provides an internal axial recess 190 into which extends a coil spring 192. This coil spring abuts at its opposite end a closure plate 196 on the end of the housing and encircles the pin 194 which functions to maintain the spring in its proper position within the housing. Slide member 188 is thus normally maintained in the position shown in FIGURE 11 by virtue of this spring, but the slide member and its housing 172 can be moved into telescoping relationship against the forces of this spring as indicated by the broken line construction of FIGURE 11. A plate 198 is secured to the end of slide member 188 and extends laterally inwardly towards the center line of the machine. This plate on its inner end provides wire guide means 200 through which the conductor extends and which functions to guide the wire inwardly of the apparatus from collet housing 174. As shown in FIGURE 14, the face of plate 200 has secured thereto by fasteners 204 a generally U-shaped base member 202 of a support providing spaced parallel arms 205. A spindle 206 extends between these arms adjacent the ends thereof and is secured by means of threaded ends having nuts 207 thereon, and this spindle in turn accommodates the ends 212 of a pair of wire guide feed arms 208. Wire guides 210 are mounted on the ends of these arms and, as best shown in FIGURES 14 and 15, these wire guides receive the ends of the wires being fed towards the operating zone of the apparatus. In normal operation the arms 208 occupy the positions shown in FIGURES 14 and 15. However, it is prudent to mount the arms yieldingly on spindle 206 in order to allow for the possibility of malfunction of the lead gripping mechanisms. To this end, the spindle 206 is rotatable against the force of leaf springs 214 which are secured by means of fasteners 216 to the arms 205. The ends of springs 214 bear against flat sides of the ends of arms 212 and thereby maintain the arms in the positions shown in FIGURE 16. However, should the arms 208 encounter an obstruction (for example, if the gripping jaws should be closed while the arms are being moved leftwardly in FIGURE 15) arms 208 will yield as the leaf springs are flexed by the base portions 212 of the arms.

The front end of reciprocable slide block 160 has secured thereto a laterally extending member 218 which projects inwardly between arms 205 and which has secured to its end an extension 220 which projects parallel to the path of reciprocation of the wire feed mechanism. The end of extension 220 is bifurcated (FIGURE 12) and receives by means of a pivot pin 226 a tripping lever 222 which is normally biased in a counterclockwise direction about its pivot by means of a spring 228. The end of lever 222 provides an upstanding lug 224 which is so located that on movement or reciprocation of the wire feed mechanism, lug 224 contacts the extension 126 of jaw tripping lever 124. Extension 220 also provides an outstanding lug 230 which is on a lower level than lug 222 (as viewed in FIGURE 7) and which is adapted to contact the tripping lever 126' for the lead gripping mechanism on the left hand one of the discs 52'. Near the end of the path of travel of the wire feed mechanism there is provided a depressor pin 232 which is carried by a support 234 which extends from rails 162. Pin 232 is so positioned that it is in alignment with an opening 236 in cross member 218 (FIGURES 14 and 15) and will contact plate 200 during movement of the wire feed mechanism from right to left in FIGURES 6 and 7. A Micro switch 238 is positioned at the extreme limit of the wire feed mechanism's travel and adapted to be tripped when the mechanism reaches the extreme limit of its travel. This Micro switch in turn controls the air supply to cylinder 170 in such manner as to reverse the flow of air or other fluid and return the mechanism to its starting position. After return of the piston rod to its starting position, the reverse motion of the piston is initiated by one of the Micro switches in a bank 240 of Micro switches which are controlled by suitable cams on a cam shaft 242. This cam shaft is connected by means of a sprocket 244 and chain 246 to a sprocket 248 on main power shaft 38. While the details of the pneumatic fluid lines have been eliminated from the drawings in the interest of clarity, it will be apparent that the reciprocation of the wire feed mechanism is controlled by means of the Micro switch 238 and one of the Micro switches 240 in the well known manner.

Assuming that the reciprocable block 160 and the associated wire feed structure are at the extreme right hand limit of travel as viewed in FIGURE 1, the wire is fed in the following manner: block 160 moves leftwardly and carries with it a length of wire equal to its stroke since upon initial leftward movement of the block collet bearings 184 are urged by camming surface 180 into compressive gripping relationship with the wires. Leftward movement of the wire feed mechanism as a unit continues until pivoted tripping lever 222 passes the latching mechanism release on the wire or lead grippers associated with disc 52. As the wire feed mechanism passes this latch, the pivoted lever pivots about its pivot point against the force of spring 228 but the latching mechanism is not released at this time and the jaws remain open as shown in FIGURE 15. Upon further travel of the wire feed mechanism the face of plate 200 is brought to bear against the end of pin 232. At this instant leftward movement of plate 200 and slide member 188 ceases but housing 172 continues to move leftwardly against the force of spring 192. Slide member 188 and its associate housing 172 are thus telescoped into each other at this time and since plate 200 and the structure associated therewith are prevented from further leftward movement by pin 232, the wires are fed an additional distance by the movement of the collet housing leftwardly relative to the components of the mechanism which are stationary during this brief interval. During this time then, wire is fed forwardly through wire guides 210 and 200 and delivered to positions between the gripping jaws associated with rotary disc 52'. In other words, during the first portion of the stroke of piston rod 168 and the wire feed mechanism, the wire is fixed relative to the feeding mechanism itself, but after the feeding mechanism is stopped by pin 232, the wire is fed leftwardly as viewed in FIGURE 6 and relative to the components of the feed mechanism which are at rest by virtue of the telescoping relationship of slide member 188 and housing 172.

When the feeding mechanism arrives at the extreme leftward limit of its travel, lug 230 contacts latch member 124' thereby causing the lead gripping jaws associated with disc 52' to snap to the closed position and tightly grip the ends of the wires. Substantially simultaneously Micro switch 238 is tripped by the slide member and the reverse stroke of the feed mechanism begins. As the feed mechanism travels rightwardly then the wire is maintained in fixed relationship to the feed mechanism by virtue of the fact that it is gripped at its ends by the gripping mechanisms on disc 52. As the wire feed mechanism passes disc 52 on its return stroke, lug 224 on lever 222 contacts the latching arm 124 associated with the wire gripping mechanisms on disc 52 and at this time the gripping mechanisms on this disc are snapped to the closed position and a length of wire is held between the gripping mechanisms on the spaced apart discs. The wire feed mechanism returns then to the extreme rightward limit of its travel and is reversed in travel for the beginning of the next cycle.

*The lead severing and lead trimming mechanisms*

Referring now to FIGURES 3, 4, 6, 7, 14, and 15, the preferred embodiment provides means for severing the fed wires after actuation of the gripping jaws on disc 52, 52'. The mechanisms for severing the wires are disposed adjacent disc member 52 and on the right hand side thereof as viewed in FIGURE 2 and comprise an upper pneumatic cylinder 248 mounted by means of a bracket 250 on a ledge 251 which extends from vertical member 30 of the framework. The piston rod 252 of the upper cylinder has secured to its lower end a block 254 which mounts an upper reciprocable blade 256. This blade is received for reciprocation within a guide groove in a block 262 which is secured by means of fasteners to block 251, and provides a pair of opposed spaced cutting edges 258, 260. It will be apparent from FIGURE 15 that blade 256 is substantially U-shaped and that the cutting edges 258, 260 constitute one inside and one outside edge thereof. This blade is normally maintained in the position shown in FIGURE 15 by means of a spring mounted within the cylinder 248 but the blade can be lowered against the force of this spring upon pneumatic actuation of the piston cylinder. A lower cylinder 262 is mounted by means of a bracket 264 on block 251 and provides a normally retracted piston rod 266 having an enlarged head 268 to which is secured a lower blade 270. This lower blade is substantially similar to blade 256 in that it is substantially U-shaped and provides cutting edges 272, 274. Cutting edge 272 is adapted to cooperate with edge 260 to sever a lead from the end of the lower one of the fed wires while cutting edge 274 is adapted to cooperate with cutting edge 258 to sever a lead from the upper one of the fed wires.

The air lines for the cylinders are connected to a suitable source of compressed air or other fluid (not shown) and the admission of air is controlled by one of the cam actuated Micro switches in switch bank 240. Admission of air to cylinders 248, 262 is so timed by means of the cams so that the blades will be closed to sever the leads immediately after the feed mechanism is retracted and the gripping mechanisms on the discs 52, 52' have been actuated to grip the end of the wire.

It is desirable under some circumstances to trim the left hand end of the severed leads as viewed in FIGURE 1, in order to obtain a high degree of precision in the length of the leads. To this end the apparatus provides a lead trimming mechanism supported upon a plate 280 which is secured to and extends normally of the guide rails 162. An L-shaped bracket 282 welded to the surface of plate 280 supports, by means of fasteners 283, a fixed blade 281 which projects toward the axis of the fed wires. The cutting edges of this fixed blade are positioned adjacent the wires so that upon movement of a reciprocable blade 288 the ends of the wires or leads will be trimmed to the desired length. This reciprocable blade is secured to the end of a piston rod 286 of a piston-cylinder 284 which is anchored on the opposite end of plate 280 from support bracket 282. Cylinder 284 is supplied with compressed air by means of an air line 290 which, like the previously noted air lines, extends from a suitable source of compressed air and is actuated by one of the Micro switches of the cam actuated Micro switch bank 240.

*The insulation stripping mechanism*

The severed leads 149 are transported by the discs 52, 52' along a circular path and positioned with their ends adjacent a pair of insulation stripping mechanisms denoted by the letter "S" in FIGURES 1 and 2. These mechanisms will now be described with particular reference to FIGURES 1, 3, and 16–19. Only the right hand one of the insulation stripping mechanisms (i.e. the stripping mechanism associated with disc 52) is shown in FIGURES 16–19 and only this mechanism will be described, since the two stripping devices are alike in substantially all respects.

A support plate 292 mounted on the top surface of vertical frame members 30 adjustably receives a base member 293 which is secured to plate 292 by means of fasteners 295 which extend through elongated slots 297 in the base. By virtue of this arrangement the entire stripping mechanism can be adjusted relatively towards and away from the ends of the leads 149 which are to be stripped thereby to vary the amount of insulation removed from the ends of the leads. Plate 292 is cut away at its front end as indicated at 294 and is secured by welding or other suitable means to a pair of upstanding side walls 296 which form a housing within which the stripping mechanism reciprocates. The insulation which is to be removed from the lead ends is cut by a pair of blades 300, 302 having beveled edge notches 304, 306. Upper blade 300 is secured to an arm 308 and lower blade 302 is secured to a somewhat similar arm 310, these arms extending rearwardly into the housing and providing bifurcated interfitting end portions 312, 314 which are pivoted upon a pin 316. A helical spring 318 is interposed between arms 308, 310 and received within suitable recesses in the arms normally to bias them away from each other although the arms are closable against the force of this spring. A plate 320 is positioned on the right hand side of the blade carrying arms, as viewed in FIGURE 17, and from this plate on the left hand thereof as viewed in FIGURE 16 there extend stub shafts 324, 322 which rotatably accommodate cam rollers 328, 326. Upper blade carrying arm 308 provides a contoured surface 330 for cooperation with roller 328 so that when the plate and roller move rightwardly relative to the arms as viewed in FIGURE 16, the arm will be urged in a counterclockwise direction about its pivotal axis on pin 316. Similarly lower arm 310 provides a contoured surface 332 for cooperation with cam roller 326 so that when plate 320 moves rightwardly relative to the arm as described above, the lower arm will be pivoted in a clockwise direction about its pivotal axis. The result of such pivotal motion of the arms 308, 310 is to move the blades towards each other into overlapping relationship to cut the insulation on the ends of the leads.

On the left hand side of the blade carrying arms as viewed in FIGURE 17, a plate 342 is provided which plate is maintained in spaced relationship to plate 320 by means of a tubular spacer 334. This spacer is internally threaded to receive threaded fasteners 336 which extend through each of the plates 320, 342 and are threadedly received within the ends of the spacer. Plate 320 and plate 342 both reciprocate during the insulation stripping operation and guide this reciprocation along the proper path; there is provided guide means 321 associated with plate 320. This guide means constitutes a lateral extension or rail which is received within a complementary groove in side wall 296. Similar guide means 343 are provided on plate 342 for cooperation with a complementary groove in the left hand one of the upstanding side walls 296 as viewed in FIGURE 17.

Elongated slots 344, 346 in the plates 320, 342 receive the ends of the pin 316, which are provided with washers as indicated at 317 of a diameter greater than the width of the slot. These slots constitute a lost motion connection between the pin and the plates and permit rightward movement of the plates as viewed in FIGURE 16 relative to the pin. Plates 320, 342 are connected at their rearward ends by means of fasteners 348 to a centrally apertured block 350 from which extends a horizontal connecting piece 352 which in turn is secured to a vertical extension 354 on the end of a piston rod 356. The piston rod extends from a pneumatic piston-cylinder 358 which is supplied with compressed air through a line 360 upon actuation of one of the Micro switches in switch bank 240. Piston rod 356 is normally maintained in the position shown in FIGURE 16 and the stripping mechanism is activated upon rightward movement of this piston rod as is described below.

A clevis 362 is received between the bifurcated end portions 312 of upper blade carrying arm 308, which clevis extends from one end of a rod 364. This rod, as best shown in FIGURE 18, projects rightwardly through the oversized opening in block 350 and through an opening in a vertical stop block 366. Stop nuts 367 on the end of this rod normally bear against the surface of stop 366 by virtue of the force of a helical spring 368 which is interposed between a collar 370, provided on rod 364 adjacent the clevis, and block 366.

Assuming that the rotary discs 52, 52′ have been indexed and the unstripped lead ends are presented to the stripping mechanisms and positioned between the stripping blades thereof as shown in FIGURE 16, the operation of the stripping device is as follows: compressed air is supplied to cylinder 358 causing rightward movement in FIGURE 16 of piston rod 356. This piston rod carries with it connecting pieces 354, 352, block 350, plates 320, and 342. As these plates move rightwardly, cam rollers 326, 328 are moved relatively over contoured surfaces 330 and 332. In this manner the blade carrying arms are cammed relatively about their pivotal axis 316 towards each other and circumferentially cut the insulation adjacent the end of the wire. During this interval described thus far, the plates 320, 342 move rightwardly relative to pivotal axis 316 (i.e. from the position of FIGURE 16 to the position of FIGURE 17) which remains stationary by virtue of the lost motion of pin slot connection 344, 316. Upon further rightward movement of the piston rod from the position of FIGURE 18, the blade carrying arms 308, 310, and the plates 320, 342 move rightwardly as a unit and the severed segments of insulation are pulled from the ends of the wire. After removal of the sections of insulation off the ends of the leads, these sections are free to fall from between the insulation cutting blades. However, it is desirable to facilitate removal of these segments by means of an air stream which may be provided from an air line 372. The air line is connected to a suitable source of compressed air (not shown) and may be actuated only after removal of the insulation by a suitable Micro switch such as one of the Micro switches in switch bank 240.

The motive fluid within cylinder 358 is then exhausted and, under the force of the spring within this cylinder, piston rod 356 is returned to its position of FIGURE 16 with concomitant opening of the blades and pivotal movement of the blade carrying arms.

*The wire bending mechanism*

In the particular embodiment of the invention herein disclosed, the stripped ends of the leads are bent through an angle of substantially 180° before being crimped onto the terminals. This bending of the stripped ends is achieved by means of mechanisms denoted by the letter "B" in FIGURES 2 and 3 and disclosed in detail FIGURES 20 and 21. One bending mechanism is provided adjacent each one of the discs 52, 52′ and since these bending mechanisms are substantially alike only the one positioned adjacent disc 52 will be described in detail.

A support 374, secured to and extending outwardly from vertical member 30, mounts at its end a pair of spaced parallel ears 376 which extend toward the plane of disc 52. Superimposed flat plates 378, 380 connect the ends of these ears and are secured thereto by means of fasteners 381. It will be noted that the plate 380 is somewhat smaller than plate 378 and that this disparity in their dimensions defines a shoulder 382. Plate 378 provides a thickened portion 384 which extends between the ends of the spaced parallel ears 376 and functions as an anvil to receive the end portion of the leads. Adjacent anvil bar 384 is a quarter round wire bending bar 388 which also extends between the opposed faces of the ears 376 and which provides eccentric pins 390 on each end thereof by means of which the bending bar is pivotally mounted between the ears. The upper one of these pins 390 extends through the upper one of the ears 376 (as viewed in FIGURE 20) and has secured thereto a gear segment 392 which meshes with a rack bar 394 on a block 396. This block is mounted for reciprocation on the upper surface of the upper one of the ears 376 and is guided along its reciprocatory path by means of a guide block 397 integral with the ear 376. The block is connected by means of a piston rod 398 to a normally retracted piston in a pneumatic cylinder 400 which is secured to vertical frame member 30 and which extends therefrom outwardly of the machine.

The bending mechanism is so fixed with relation to disc 52 that the stripped ends of the wires are positioned in V-shaped notches 386 when the disc indexes to position an unbent set of leads for the bending operation. After the machine has been thus indexed, compressed air is supplied, by means of a valve (not specifically shown) which is actuated by one of the Micro switches of switch bank 240, to cylinder 400 and piston rod 398 urges block 396 outwardly from the position of FIGURE 20 to the position of FIGURE 21. As this movement of the piston rod takes place, the quarter round bending bar 388 is rotated through an angle of approximately 180° on its eccentric pivots 390 to bend the stripped ends of the leads back upon themselves after the manner illustrated in FIGURES 20 and 21. It is desirable that the leads be gripped or clamped close to their stripped ends during this bending operation in order to rigidify these ends and produce a neat bend in the lead ends. Such clamping of the ends of the leads is achieved by means of a clamping bar 404 mounted on the ends of fingers 406 which are integral with a shaft 408 pivoted at one end in an extension from the lower one of the ears 376 and at its opposite end extending through block 397. The fingers 406 are normally urged inwardly, toward the axis or center line of the apparatus and into gripping or clamping engagement with the ends of leads 149, as shown in FIGURE 21, by means of a spring 410 which is connected at one end to one of the fingers 406 and at its opposite end is anchored to any convenient fixed point on bracket 374. It is necessary, however, to swing clamping bar 404 out of engagement with the lead ends during indexing of the disc 52 as an unbent set of leads are moved along a circular path and positioned between the bars 378, 380 and the clamping bar 404. In order to achieve this, an arm 410 is mounted on the end of shaft 408 which arm is adapted to be contacted by a pin 414 which depends from a plate or extension 412 secured at its end to block 396. Thus as the piston rod 398 and block 396 are retracted and moved from the position of FIGURE 21 to the position of FIGURE 20 after the completion of a bending operation, pin 414 contacts arm 410 and rotates shaft 408 through an angle of about 45° to swing fingers 406 outwardly and move clamping bar 404 out of engagement with fixed bars 380, 378.

*The lead end kinking device*

In the particular embodiment of the apparatus herein described, the terminals are of the type providing an open U barrel, that is to say a ferrule-forming portion which is U-shaped in cross section and within which the stripped end of the wire is positioned prior to crimping. In order to facilitate the positioning of the ends of the leads in these open-U terminals, and particularly to permit the lead ends to clear the upstanding side walls of the terminals as they are moved into their crimping stations, it is desirable to kink slightly the ends of the leads so that these end portions of the leads will project towards the axis of upper shaft 46. Devices for achieving this result are disclosed in FIGURES 2, 3, and 22 and will now be described.

A fixed kinking bar 416 extends angularly outwardly of the apparatus from a bracket 417 which is secured to vertical member 30. In spaced relationship to this fixed kinking bar there is provided a movable kinking bar 418 which in its normal position is substantially parallel to the fixed bar as shown in FIGURE 22. This movable kinking bar extends from a hub which is pivoted as indicated at 420 and which provides an integral arm 422. Arm 422 projects towards the reciprocable ram, described below, and provides a pin 424 adjacent its end which pin is adapted to be contacted by a second pin 426 which extends outwardly from ram member 450. A spring 428, connected at one end to arm 422 and at its opposite end to fixed kinking bar 416, serves normally to bias arm 422 and the movable kinking bar 418 in the position shown in FIGURE 18. Upon downward movement of ram 430, however, pin 426 contacts pin 424 and causes the latter pin to describe a circular path, shown in broken line construction, which in turn causes movable arm 418 to swing clockwise towards fixed arm 416.

The kinking mechanisms are so positioned that the ends of the leads will travel along the arcuate path shown in broken line construction in FIGURE 28 and will be positioned between the fixed and movable kinking bars 416, 418. Ram 430 descends while the discs 52, 52′ are at rest and during this interval the kink is produced in the wire by the movement of arm 418. It will be understood that the arms or kinking bars 416, 418 must be spaced from each other a distance sufficient to permit the lead ends to travel therebetween along the path indicated in FIGURE 22. It will also be understood that two of the kinking mechanisms of the type shown in FIGURE 22 are provided, one adjacent each of the discs 52, 52′ and that these devices are substantially similar in construction each to the other.

*The crimping mechanism*

Spaced crimping mechanisms denoted by the letter "C" in FIGURE 2 are provided adjacent each of the discs at the final station. The left hand one of these crimping mechanisms is shown in detail in FIGURES 5 and 22–24 along with the terminal feed mechanism described below. The reference numerals used with reference to the crimping end terminal feed mechanisms of FIGURE 5, it will be noted, are provided with a prime (′) mark superscript to denote the fact that the crimping mechanism associated with disc 52′ is being specifically shown. The corresponding crimping mechanism and terminal feed mechanism associated with disc 52 are of substantially the same construction.

A block 434′, mounted on housing 20′ by means of threaded fasteners 435′, has adjustably secured thereto a tool holder 436′ by means of screws 439′ which extend through slots 441′. Tool holder 436′ provides a cross member 490′ and receives within the pocket formed by this cross member and the sides of the tool holder a pair of lower crimping dies or anvils 432′ shown also in FIGURE 26. The lower portions of the anvils are received within complementary slots in a tool mounting block 430′ and are affixed thereto as by fasteners 433′. This tool mounting block is beveled along its upper surface and cut away as at 429′ to permit bottoming of the upper crimping die. A spacer 441′ is interposed between the tool mounting block and the cross member 490′ of the tool holder. Fasteners 431′ extend through block 430′, through spacer 441′ and are received within cross member 490 to secure the block and spacer in assembled relationship. The central portion of the spacer is cut away to form a slot 443′ in communication with a slot 435′; these slots form a passageway for the slugs which are removed during a crimping operation.

Upper crimping die 440′ is secured by means of fasteners 442′ to an upper tool holder 446′. Also mounted in this upper tool holder are a hold-down bar 449′ and a slug-out blade 448′. During descent of the ram, the slug-out blade removes the small slugs which connect successive connectors in the strip of connectors while the hold-down blade temporarily clamps the end one of the connectors during final crimping. Suitable spacers are interposed to achieve the correct spacing between upper crimping die 440′, blade 449′, and slug-out blade 448′.

Tool holder 446′ is connected by means of a socket and pin connection 426′, 450′ to an extension 430′ of a ram 452′ which provides a central opening 456′ through which the terminals are fed, as described below.

The ram extends downwardly between suitable guide ways 453′ and is bifurcated at its lower end to receive a clevis block 458 to which it is pivotally connected by means of a pin 460. Block 458′ is in turn threadedly connected by means of a coupling 462′ to the bearing housing 464′ of an eccentric 466′ which is keyed or otherwise secured to a transverse shaft 468′. This transverse shaft 468′ extends normally of main power shaft 36 and is continuously rotated with this main power shaft by means of bevel gears 472′ and 480′ on shaft 468′ and 36 respectively.

In operation, the stripped, bent, and kinked ends of the leads are positioned, upon indexing of disc 52′, directly over the previously positioned side-by-side terminals "T," thereafter and as shaft 468′ rotates through an angle of 180° from the position shown in FIGURE 5, the ram and its associated projection 430′ descend to bring the hold-down bars 449′ into clamping relationship, and the crimping dies into crimping relationship, with the terminals. At substantally the same time, the slug-out blades remove the connecting slugs between the end one of the terminals and the next adjacent terminals. The removed slugs fall through the slots 443′, 435′ to a chute 451′ which conveys them to a receptacle.

When the terminals are crimped by upper dies, there is sometimes a tendency for the crimped ferrules of the terminals to become wedged within the upper dies and remain so wedged during the return stroke of the ram. To obviate such jamming of the terminals a bar 438′ is provided on plate 417′ which bar extends across and above the path of terminal feed. In the event that the crimped terminals should become wedged within the dies, this bar functions as a knock-out device to remove them.

*The terminal feed mechanism*

In the illustrative embodiments, strips of terminals connected to each other in end-to-end relation are fed from each side of the machine toward the crimping mechanisms described above. The left hand one of these terminal feeding mechanisms will now be described with particular reference to FIGURES 1, 3 and 5.

A ledge 486′ on press housing 20′ has secured thereto a plate 484′ which extends leftwardly in FIGURE 5 and mounts on its end a set of guide tubes 496′. Terminals in strip form are fed from reels 492′ supported on stands 494′ through these guide tubes and along parallel paths provided on the support plate 484′. An additional plate 488′ extends from the end of plate 484′ to the crimping zone through the opening 456′ in the press ram 452′. The terminals are intermittently moved along their feed paths by means of a piston cylinder 498′ mounted on brackets extending from an upstanding plate 500′ which is secured along one edge of plate 484′ and by means of a bracket 509′, best shown in FIGURE 5, secured to plate 484′. The piston cylinder provides a piston rod 502′ adapted to reciprocate towards and away from the crimping zone, the amplitude of travel of this piston being limited by a stop member 508′ integral with the piston rod which is adapted to butt against an overhanging portion 506′ of a stop 504′ which extends from and is integral with cylinder 498′. A pin-slot connection 507′ between stop 508′ and the top portion of stop 504′ supports the piston rod and guides it along its path of reciprocation. The end of piston rod 502′ provides a yoke 511′ which pivotally mounts at 510′ a pair of side by side feed fingers 512′. The terminals "T" shown in the drawing provide a U-shaped ferrule-forming portion 514 and a pin portion 516 as best shown in FIGURE 5, the pin portion being separated from the U-shaped ferrule portion by a notch-like discontinuity. During feeding of the terminals, as piston rod 502′ moves rightwardly in FIGURE 5, the terminals are pushed rightwardly by the tip 513′ of the finger which abuts against the U-shaped portion of the terminals 514 and within the notch-like section separating the pin portion and the U-shaped portion of the terminals. On the return stroke of the piston, the fingers are permitted by virtue of their pivotal connection at 510′ to slide over the pin portion 516 of the terminals and over the U-shaped portion of the next succeeding terminal.

Piston cylinder 498′ is actuated once during each cycle of the crimping mechanism by means of a Micro switch in the Micro switch bank 240. The compressed air for this cylinder is supported by a suitable air line 497′ which extends from a suitable compressed air source.

It is desirable to provide some means for lightly clamping or holding the strips of terminals against the extension plate 488′ over which they pass along their path of travel to the crimping zone. To this end, the disclosed apparatus provides a hold-down shoe 522′ which is pivotally connected at its ends to the ends of levers 520′ which in turn is pivoted intermediate its ends on upstanding brackets 518′. Each of the levers 520′ is normally biased in a clockwise direction by means of a spring 524′ which is connected at one end to an extension or pin 526′ integral with the lever and is connected at its opposite end to a plate 525′ which is secured to a block on plate 488.

This hold-down device functions to maintain the strips of terminals against plate 488 since the terminals from the reels 492′ might otherwise have a slight tendency to assume an arcuate configuration. In addition the mild pressure exerted on the strips of terminals by shoe 522′ prevents overfeeding of the terminals into the operating or crimping zone and thereby insures precise positioning of the barrel-forming portions of the terminals upon the lower die or crimping anvils.

FIGURES 27 and 28 show an alternative type of insulation cutting and stripping mechanism, similar to the wire stripping apparatus shown in U.S. Patent No. 1,666,277, for use with the disclosed embodiment of the invention. As shown in these figures, this mechanism is mounted on the upper surface of plate 292 by means of fasteners 529 and comprises a generally U-shaped block 530 which is cut away along one leg thereof as indicated at 532. An upper reciprocable jaw 534 is disposed against the upper one of the legs 531 of block 530 and is guided for reciprocation therealong by means of rails 536, 538, the rail 536 being received within a complementary groove in block 530 while the rail 538 is received within a similar groove in a bracket 568 described below. This upper jaw is pivoted at its end at 540 to a lower jaw member 542, this lower jaw being adapted to reciprocate with the upper jaw and additionally being adapted to be pivoted towards and away from the upper jaw as described below.

Upper jaw 534 has secured to its front end a pair of insulation cutting and stripping knives 544 and lower jaw 542 has secured to its end a complementary pair of knives 546. A bolt 552 is threadedly received in jaw 534 and extends through an oversize opening in jaw 542. A helical spring 556 interposed between the head of bolt 552 and the surface of jaw 542 normally urges this jaw against jaw 534 and thereby normally maintains the knives in insulation cutting relationship with each other. The extent of motion or the travel of this lower jaw is limited by means of a stop 554 mounted on this bolt between the jaw members. A bearing plate 548, secured to block 530, provides support for lower jaw 542 and additionally provides a curved surface 543 which permits jaw 542 to be opened as described below.

A lever 564 is pivoted at one of its ends at 566 to a bracket 568 secured to leg 531 and extends between the jaw members 534 and 542. At its opposite end this lever is offset at 570 and is secured to the piston rod 572 of a piston cylinder 574. This piston cylinder is intermittently actuated by means of one of the Micro switches of switch bank 240 in the same manner as the piston cylinder of the previously described insulation cutting and stripping mechanism and is provided with an internal spring which normally retains the piston in the retracted position so that the lever 564 is normally biased as indicated in FIGURE 27, i.e. to the left in this figure. When the lever is in this position it bears against a roller 558 mounted in lower jaw member 542 and maintains the jaw and its knives in the open position with respect to upper jaw 534 so that the wires can be carried by rotary disc 52 and positioned between knives 544, 546. On the opposite side of lever 564 from roller 558, an additional roller 560 is mounted on a pin 562 the ends of which are received in the jaw members 534, 542. With this arrangement, upon actuation of piston cylinder 574, lever 564 initially moves out of engagement with roller 558 and spring 556 immediately functions to pivot jaw 542 about its pivot point 540 towards jaw 534. The knives 544, 546 are thus moved towards each other and cut through the insulation adjacent the ends of the wires 149. Thereafter and upon further movement of the piston rod 572, lever 564 is swung a further distance and is brought into engagement with roller 560 so that upon still further motion of lever 564, the entire jaw assembly 534, 542, is moved rightwardly as viewed in FIGURE 27 to strip the severed section of insulation from the end of the wire.

After the severed sections of insulation have been stripped from the wire ends, the rotary discs 52, 52′ are again indexed and the wires are moved leftwardly in FIGURE 28 to the wire end bending station. A slot may be provided, as indicated at 576, to provide the clearance necessary for this movement of the wire. The severed sections of insulation may be removed by means of an air blast (not specifically shown) as in the case of the previously described stripping mechanism.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. In a lead-making apparatus, the combination of a pair of spaced apart plates mounted on a common axis, means for periodically indexing said plates, a plurality of lead grippers on each of said plates and evenly spaced around the peripheries thereof, each of the grippers on one of said plates being in axial alignment with a corresponding gripper on the other of said plates, each of said grippers comprising a pair of jaws and including spring means normally biasing said jaws into closed position, cam means engageable with portions of said lead grippers for opening said jaws during indexing of said discs to a first station, a latch on each of said grippers to hold said jaws in their open positions at said first station, wire feed means including a wire pulling member movable from a rest position past said plates and between said open jaws thereby to pull wire from an endless source and position the end portion of said wire between said open jaws, said wire pulling member being movable in the opposite direction to its rest position after pulling of said wire, a pair of normally open severing blades disposed on said path at a location between said rest position of said wire pulling member and the first one of said plates which said pulling member passes during movement thereof, means on said pulling member for engaging said latches during return movement of said pulling member to close said jaws, and means responsive to movement of said wire carrying member for closing said severing blades to sever said wire after return movement of said wire carrying member to said rest position.

2. In a lead making machine, the combination of a pair of axially aligned and spaced-apart lead grippers, means for intermittently moving said grippers in unison from a first position along a closed circuit and back to said first position, said grippers being closed during movement along said closed circuit, means for opening said grippers during movement and immediately prior to arrival at said first position, latch means for holding said grippers in open position, a wire carrying member movable from a rest position along a path extending parallel to the axis of and past both of said grippers to feed said wire when said grippers are in said first position, said wire carrying member being movable in the opposite direction to its rest position after feeding of said wire, said wire carrying member having a wire holding portion extending towards the axis of said grippers for holding the end of a wire in alignment with said grippers, means on said wire carrying member for gripping said wire during movement in the wire feeding direction and for releasing said wire during movement in the opposite direction, means on said wire carrying member engageable with said latch means during movement in said opposite direction to disengage said latch means to permit closure of said grippers, a pair of normally open wire severing blades disposed on said path and between said rest position of said wire carrying member and the first one of said grippers which said wire carrying member passes during movement thereof in said wire feeding direction, whereby wire is pulled from an endless source and positioned in said grippers during movement of said wire holding member in a feeding direction, and said grippers are engaged with said wire during movement of said wire carrying member in said opposite direction and means responsive to movement of said wire carrying member for closing said severing blades to sever said wire after return movement of said wire carrying member to said rest position.

3. In a lead making apparatus, the combination of a pair of spaced-apart plates mounted for rotation on a common axis, means for periodically indexing said plates, a plurality of lead gripping means on each of said plates at evenly spaced intervals around the peripheries thereof, each of the grippers on one of said plates being in axial alignment with a corresponding gripper on the other of said plates, each of said gripping means comprising a pair of jaws normally biased to a closed position by spring means, cam means engageable with said gripping means during indexing of said plates to a first station to open said jaws, a latch on each of said gripping means to hold said gripping means in open position at said first station, wire feed means including a wire-pulling member movable from a rest position along a path extending parallel to, and substantially coextensive with, the axis of said plates to pull wire from a substantially endless source, said wire pulling member being thereafter movable in the opposite direction to said rest position, said wire-pulling member comprising a collet adapted to grip said wire when said member is moving in a feeding direction and to release said wire when said member is moving in the opposite direction, a pair of normally open severing blades disposed on said path at a location between said rest position and the first one of said grippers which said wire carrying member passes during movement thereof, means for reciprocating said wire-pulling member, and means on said wire-pulling means for engaging said latch means during movement thereof in said opposite direction to disengage said latch means and thereby permit closure of said jaws and means responsive to movement of said wire carrying member for closing said severing blades to sever said wire after return movement of said wire carrying member to said rest position.

References Cited in the file of this patent

UNITED STATES PATENTS

| | | |
|---|---|---|
| 515,347 | Manville | Feb. 27, 1894 |
| 1,136,778 | Dayton | Apr. 20, 1915 |
| 2,225,739 | Elliot | Dec. 24, 1940 |
| 2,299,984 | Horwitz | Oct. 27, 1942 |
| 2,307,046 | Johnson et al. | Jan. 5, 1943 |
| 2,465,453 | Holbrook | Mar. 29, 1949 |
| 2,571,078 | Vollmer | Oct. 9, 1951 |
| 2,600,694 | Sakirsky | June 17, 1952 |
| 2,639,491 | Rose et al. | May 26, 1953 |
| 2,639,493 | Rose et al. | May 26, 1953 |
| 2,645,959 | Fuchs et al. | July 21, 1953 |
| 2,656,588 | Ovshinsky | Oct. 27, 1953 |
| 2,668,590 | De Witt et al. | Feb. 9, 1954 |
| 2,673,345 | Berg | Mar. 30, 1954 |
| 2,688,133 | Berg | Sept. 7, 1954 |
| 2,696,880 | Bechard et al. | Dec. 14, 1954 |
| 2,729,879 | Sampson | Jan. 10, 1956 |
| 2,765,468 | Cootes et al. | Oct. 9, 1956 |
| 2,774,130 | Folkenroth | Dec. 18, 1956 |

FOREIGN PATENTS

| | | |
|---|---|---|
| 750,566 | Great Britain | June 20, 1956 |